United States Patent
Kuntman et al.

(10) Patent No.: US 6,313,783 B1
(45) Date of Patent: Nov. 6, 2001

(54) TRANSPONDER HAVING DIRECTIONAL ANTENNAS

(75) Inventors: Daryal Kuntman, Bellevue, WA (US); Ruy L. Brandao, Fort Lauderdale, FL (US); Ruy C. P. Brandao, Redmond, WA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/369,958

(22) Filed: Aug. 6, 1999

Related U.S. Application Data
(60) Provisional application No. 60/125,994, filed on Mar. 24, 1999.

(51) Int. Cl.[7] ............................. G01S 13/74; G01S 13/93
(52) U.S. Cl. ........................... 342/32; 342/29; 342/30; 342/36; 342/37; 342/42; 342/51
(58) Field of Search ......................... 342/29–32, 36–40, 342/42–51, 156, 351, 417–424

(56) References Cited

U.S. PATENT DOCUMENTS

| | | | |
|---|---|---|---|
| 3,375,516 | * | 3/1968 | Hart et al. ............................. 342/51 |
| 3,792,472 | * | 2/1974 | Payne et al. ........................... 342/32 |
| 4,638,320 | | 1/1987 | Eggert et al. ......................... 342/442 |
| 4,855,748 | | 8/1989 | Brandao et al. ...................... 342/455 |
| 5,041,800 | | 8/1991 | Long et al. . | 
| 5,077,673 | | 12/1991 | Brodegard et al. . |
| 5,157,615 | | 10/1992 | Brodegard et al. . |
| 5,182,563 | | 1/1993 | Blinchikoff et al. .................. 342/32 |
| 5,185,606 | | 2/1993 | Verbaarschot et al. . |
| 5,191,340 | | 3/1993 | Brandao et al. . |
| 5,191,349 | | 3/1993 | Dinsmore et al. .................... 343/751 |
| 5,200,928 | | 4/1993 | MaCleod . |
| 5,235,336 | * | 8/1993 | Sturm et al. .......................... 342/30 |
| 5,280,285 | | 1/1994 | Curtis . |
| 5,302,953 | | 4/1994 | Pierre et al. .......................... 342/37 |
| 5,317,316 | | 5/1994 | Sturm . |
| 5,455,586 | | 10/1995 | Barbier et al. ....................... 342/37 |
| 5,528,244 | | 6/1996 | Schwab ................................. 342/37 |
| 5,552,788 | | 9/1996 | Ryan et al. ........................... 342/30 |
| 5,604,504 | | 2/1997 | Nail ..................................... 342/417 |
| 5,619,206 | | 4/1997 | Cole, Jr. et al. ...................... 342/37 |
| 5,629,692 | | 5/1997 | Stayton et al. . |
| 5,636,123 | | 6/1997 | Rich et al. . |
| 5,721,628 | | 2/1998 | Phillips et al. . |
| 5,805,111 | | 9/1998 | Brettner, III et al. ................ 342/455 |

OTHER PUBLICATIONS

AlliedSignal Product Brochure: Directional Antenna ANT 81A, Copyright 2000.

* cited by examiner

*Primary Examiner*—Bernarr E. Gregory

(57) ABSTRACT

A method and apparatus for transmitting a directional reply signals in response to Air Traffic Control Radar Beacon System and Mode Select signals interrogation signals. Two directional antennas independently acquire an interrogation signal and are connected by means of a configurable switch to a transponder. The antennas may include multiple directional antenna elements.

31 Claims, 12 Drawing Sheets

*FIGURE 11*
(PRIOR ART)
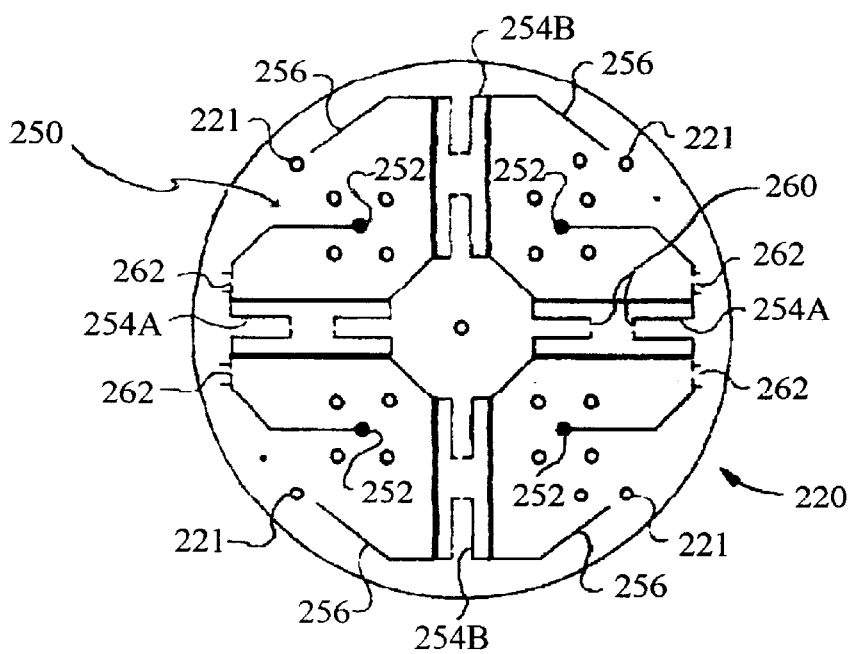
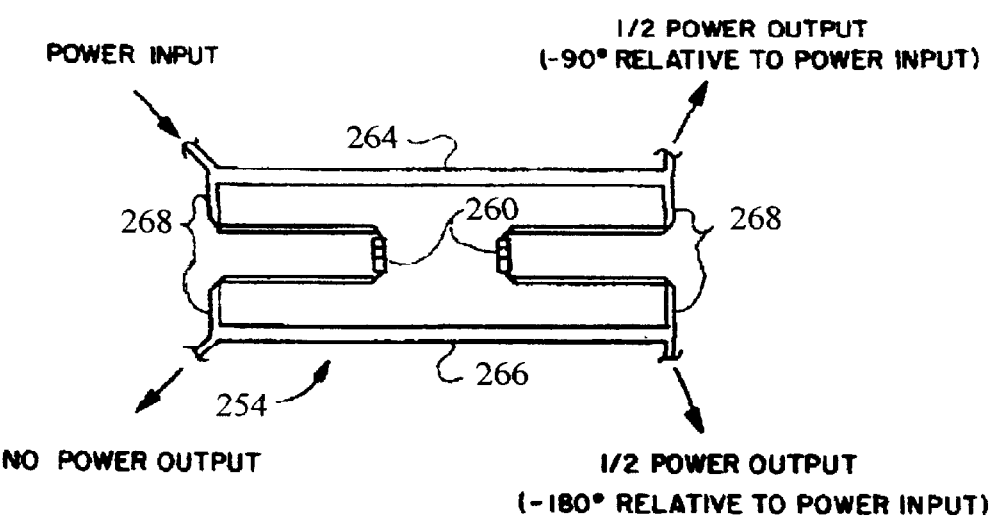
*FIGURE 12*
(PRIOR ART)

TRANSPONDER HAVING DIRECTIONAL ANTENNAS

This application claims the benefit of U.S. Provisional Application Ser. No. 60/125,994, filed in the names of Daryal Kuntman, Ruy L. Brandao, and Ruy C. P. Brandao on Mar. 24, 1999, the entirety of which is incorporated herein by reference.

FIELD OF THE INVENTION

The present invention relates generally to aircraft surveillance and collision avoidance systems, and particularly, to combined Air Traffic Control Radar Beacon System/Mode Select (ATCRBS/Mode-S) and Air Traffic Alert and Collision Avoidance System (TCAS) systems utilizing common antennas.

BACKGROUND OF THE INVENTION

Aircraft pilots are expected to visually identify collision threats and avoid them. This "see and avoid" technique based on the pilot's visual sense remains the most basic method of aircraft collision avoidance. However, since the 1950's electronic techniques based on radio frequency and optical transmissions have been developed to supplement the pilot's visual sense. The government has developed and implemented a system of ground based and aircraft carried equipment designated the Air Traffic Control Radar Beacon System (ATCRBS). This system includes two different types of ground based radar emitters located at each of a plurality of Air Traffic Control (ATC) stations. One type of radar is referred to as the Primary Surveillance Radar (PSR), or simply as the primary radar. The primary radar operates by sending out microwave energy which is reflected back by the aircraft's metallic surfaces. This reflected signal is received back at the ground radar site and displayed as location information for use by an air traffic controller. The second type of radar is referred to as the Secondary Surveillance Radar (SSR), or simply secondary radar. Unlike the primary radar, the SSR is a cooperative system in that it does not rely on reflected energy from the aircraft. Instead, the ground based SSR antenna transmits a coded 1030 MHz microwave interrogation signal. A transponder, i.e., a transmitter/receiver, carried on the aircraft receives and interprets the interrogation signal and transmits a 1090 MHz microwave reply signal back to the SSR ground site. This receive and reply capability greatly increases the surveillance range of the radar and enables an aircraft identification function, referred to as Mode-A, wherein the aircraft transponder includes an identification code as part of its reply signal. This identification code causes the aircraft's image or blip on the ATC operator's radar screen to stand out from the other targets for a short time, usually about 20 seconds. Thus, Mode-A provides an rudimentary identification function.

In addition to the identification function provided by Mode-A, the aircraft altimeter is typically coupled to the transponder such that a reply signal includes altitude information, referred to as Mode-C.

A ground based SSR sequentially transmits both Made A and Mode-C interrogation signals to aircraft in the area. Accordingly, the interrogation signal transmitted by the SSR contains three pulses. The second pulse is a side-lobe suppression signal transmitted from an omnidirectional antenna co-located with a mechanically rotating antenna which provides a highly directive antenna beam. The first and third pulses are transmitted by the directive antenna at a predetermined frequency and are separated by a predetermined interval. The time interval between the first and third pulses defines what information the interrogator is requesting: eight (8) microseconds for identification and twenty-one (21) microseconds for altitude. The operator of the ground based SSR sets the radar interrogation code to request either Mode-A or Mode-C replies from the aircraft transponder. Typically, the radar is set to request a sequence of two Mode-A replies followed by a single Mode-C reply. This sequence is repeated so that a radar operator continuously receives both the Mode-A identification code and the Mode-C altitude information. Upon receipt of the interrogation signal, the aircraft transponder develops and transmits a reply signal which includes the identification or altitude information. The ground based SSR receives and processes the transponder reply signal, together with time of arrival range information, to develop a measurement of position for each responding aircraft. Under such a system, the air traffic controller uses this information to contact involve the aircraft by radio, usually with voice communication, to maintain or restore safe separations between aircraft. The system is inherently limited because each aircraft needs be dealt with individually which requires a share of the air traffic controller's time and attention. When traffic is heavy, or visibility is low, collision potential increases.

During the 1960's the increases in the number of aircraft, the percentage of aircraft quipped with transponders, and the number of ATCRBS radar installations began to overload the ATCRBS system. This system overload caused a significant amount of interference and garble in the Mode-A and Mode-C transmissions because of replies from many simultaneously interrogated aircraft. Furthermore, the Mode-A and Mode-C systems are unable to relay additional information or messages between the ground based SSR and the interrogated aircraft, other than the aforementioned identification and altitude information. The Mode Select, or Mode-S, was the response to this overload and other deficiencies in ATCRBS. Mode-S is a combined secondary surveillance radar and a ground-air-ground data link system which provides aircraft surveillance and communication necessary to support automated ATC in the dense air traffic environments of today.

Mode-S incorporates various techniques for substantially reducing transmission interference and provides active transmission of messages or additional information by the ground based SSR. The Mode-S sensor includes all the essential features of ATCRBS, and additionally includes individually timed and addressed interrogations to Mode-S transponders carried by aircraft. Additionally, the ground based rotating directive antenna is of monopulse design which improves position determination of ATCRBS target aircraft while reducing the number of required interrogations and responses, thereby improving the radio frequency (RF) interference environment. Mode-S is capable of common channel interoperation with the ATC beacon system. The Mode-S system uses the same frequencies for interrogations and replies as the ATCRBS. Furthermore, the waveforms, or modulation techniques, used in the Mode-S interrogation signal were chosen such that, with proper demodulation, the information content is detectable in the presence of overlaid ATCRBS signals and the modulation of the downlink or reply transmission from the transponder is pulse position modulation (PPM) which is inherently resistant to ATCRBS random pulses. Thus, the Mode-S system allows full surveillance in an integrated ATCRBS/Mode-S environment.

The Radio Technical Commission for Aeronautics (RTCA) has promulgated a specification for the Mode-S system, RTCA/DO-181A, *Minimum Operational Performance Standards for Air Traffic Control Radar Beacon System/Mode Select (ATCRBS/Mode-S) Airborne Equipment*, issued Jan. 1992, and incorporated herein by reference. According to RTCA specification DO-181A, the airborne portion of the Mode-S system includes in one form or another at least a dedicated transponder, a cockpit mounted control panel, two dedicated antennas and cables interconnecting the other elements. Shadowing is attenuation of the received transponder signals by the airframe blocking the antenna from the SSR ground station transmitter when a single antenna is used. The shadowing problem is overcome by locating a first antenna on a top surface of the aircraft and a second antenna on a bottom surface of the aircraft. As discussed more fully below, each aircraft may be within range of more than one SSR ground station at any time and must respond to interrogation signals broadcast from multiple directions. Therefore, the Mode-S system uses two single element omnidirectional antennas to receive interrogation signals from any quarter and reply in kind.

In operation, a unique 24-bit address code, or identity tag, is assigned to each aircraft in a surveillance area by one of two techniques. One technique is a Mode-S "squitter" preformed by the airborne transponder. Once per second, the Mode-S transponder spontaneously and pseudo-randomly transmits (squits) an unsolicited broadcast, including a specific address code unique to the aircraft carrying the transponder, via first one and then the other of its two dedicated antennas which produce an omnidirectional pattern, discussed below. The transponder's transmit and receive modes are mutually exclusive to avoid damage to the equipment. Whenever the Mode-S transponder is not broadcasting, it is monitoring, or "listening," for transmissions simultaneously on both of its dedicated omnidirectional antennas. According to the second technique, each ground based Mode-S interrogator broadcasts an ATCRBS/Mode-S "All-Call" interrogation signal which has a waveform that can be understood by both ATCRBS and Mode-S transponders. When an aircraft equipped with a standard ATCRBS transponder enters the airspace served by an ATC Mode-S interrogator, the transponder responds to the with a standard ATCRBS reply format, while the transponder of a Mode-S equipped aircraft replies with a Mode-S format that includes a unique 24-bit address code, or identity tag. This address, together with the aircraft's range and azimuth location, is entered into a file, commonly known as putting the aircraft on roll-call, and the aircraft is thereafter discretely addressed. The aircraft is tracked by the ATC interrogator throughout its assigned airspace and, during subsequent interrogations, the Mode-S transponder reports in its replies either its altitude or its ATCRBS 4096 code, depending upon the type of discrete interrogation received. As the Mode-S equipped aircraft moves from the airspace served by one ATC Mode-S interrogator into that airspace served by another Mode-S interrogator, the aircraft's location information and discrete address code are passed on via landlines, else either the ground based SSR station picks up the Mode-S transponder's "squitter" or the Mode-S transponder responds to the All-Call interrogation signal broadcast by the next ATC Mode-S interrogator.

The unique 24-bit address code, or identity tag, assigned to each aircraft is the primary difference between the Mode-S system and ATCRBS. The unique 24-bit address code allows a very large number of aircraft to operate in the air traffic control environment without an occurrence of redundant address codes. Parity check bits overlaid on the address code assure that a message is accepted only by the intended aircraft. Thus, interrogations are directed to a particular aircraft using this unique address code and the replies are unambiguously identified. The unique address coded into each interrogation and reply also permits inclusion of data link messages to and/or from a particular aircraft. To date, these data link messages are limited to coordination messages between TCAS equipped aircraft, as discussed below. In future, these data link messages are expected to include Aircraft Operational Command (AOC) information consisting of two to three pages of text data with flight arrival information, such as gates, passenger lists, meals on board, and similar information, as well as Flight Critical Data (FCD). However, the primary function of Mode-S is surveillance and the primary purpose of surveillance remains collision avoidance.

Collision avoidance systems which depend on aircraft carried transponders are usually divided into two classes: passive and active. The ATCRBS, including Mode-S, described above are passive systems because the transponder reply emissions alone provide the only information for locating and identifying potential threats. While passive systems tend to be simple and low cost when compared to active systems and do not crowd the spectrum with additional RF transmissions, detection of transponder emissions from other aircraft is difficult. A passive collision threat detector is essentially a receiver having sufficient intelligence to first detect and then locate the existence of potential collision threats represented by nearby aircraft. The aircraft's receiver is of necessity operating in close proximity to the host aircraft's ATCRBS transponder. Government regulations require the ATCRBS transponder to emit RF energy at 125–500 watts in response to interrogation signals from a ground based SSR. The transponder aboard any potential collision threat aircraft flying along a radial from the directional SSR antenna, usually about 3° to 4° wide, will respond at about the same time as the host aircraft's transponder. The host aircraft's transponder is so much closer, usually no more than a few feet, to any receiver that the host aircraft's own response to the interrogation signal will swamp the response from any other aircraft in its vicinity. Thus, the host aircraft flies in a "blind" region wherein any potential threat aircraft is not "seen," unless other provisions are made. This blind region expands as the target approaches the host. Furthermore, typically each aircraft is within range of more than one SSR site and a blind region is associated with each SSR site. Because wholly passive systems are generally believed insufficient for reliable collision avoidance, the government and aviation industry have cooperated in developing Operational Performance Standards for a Traffic Alert and Collision Avoidance or TCAS system, separate from the ATCRBS/Mode-S transponder system. The standards are set forth in the RTCA specifications DO-185, *Minimum Operational Performance Standards for Air Traffic Alert and Collision Avoidance System (TCAS) Airborne Equipment*, issued Sep. 23, 1983, consolidated Sep. 6, 1990, and DO-185A, *Minimum Operational Performance Standards for Air Traffic Alert and Collision Avoidance System II (TCAS II) Airborne Equipment*, issued Dec. 1997, both of which are incorporated herein by reference.

TCAS is a well-known active collision avoidance system that relies upon reply signals from airborne transponders in response to interrogation signals from an aircraft equipped with a ATCRBS Mode-A/Mode-C or Mode-S transponder. The TCAS antenna is driven to produce an omnidirectional microwave transmission, or radiation, pattern carrying a transponder generated coded interrogation signal at 1030

MHz, the same frequency used by ground based SSR stations to interrogate Mode-S transponders. Whenever the TCAS transponder is not broadcasting, it is "listening" for Mode-S "squitters" and reply transmissions at 1090 MHz, the same frequency used by Mode-S transponders to reply to interrogation signals. Thus, a TCAS equipped aircraft can "see" other aircraft carrying a transponder. Once a transponder equipped target has been "seen," the target is tracked and the threat potential is determined. Altitude information is essential in determining a target's threat potential. Comparison between the altitude information encoded in the reply transmission from the threat aircraft and the host aircraft's altimeter is made in the TCAS processor and the pilot is directed obtain a safe altitude separation, by descending, ascending or maintaining current altitude.

Collision avoidance is enhanced by including range information during threat determination. The approximate range, or distance between the host aircraft and the target, is based on the strength of the received transponder signal in response to an interrogation signal from the host aircraft. Modern TCAS systems obtain more accurate range information by measuring the time lapse between transmission of the interrogation signal and reception of the reply signal, commonly known as "turn around time." The time to closest approach as determined by the TCAS processor is the primary consideration in threat determination.

Knowledge of the direction, or bearing, of the target aircraft relative to the host aircraft's heading greatly enhances a pilot's ability to visually acquire the threat aircraft and provides a better spatial perspective of the threat aircraft relative to the host aircraft. The TCAS processor can display bearing information if it is available. Bearing information is also used by the TCAS processor to better determine threat potential presented by an intruder aircraft. Directional antennas are used in some TCAS systems for determining angle of arrival data which is converted into relative bearing to a threat aircraft by the TCAS processor. Several methods exist for determining angle of arrival data. One common arrangement uses a phase matched quadrapole antenna array with output signals being combined such that the phase difference between two output ports of the combining circuitry indicates the bearing of a received transponder signal. Another method for determining angle of arrival data include a method based on signal phase, commonly known as phase interferometry. Still another commonly known method is based on signal amplitude. Attenuation of the received transponder signals by the airframe blocking the antenna from the transmitter is often overcome by locating a primary directional antenna on a top surface of the aircraft and a second antenna on a bottom surface of the aircraft. The second or bottom antenna is sometimes omnidirectional which reduces cost at the expense of reduced directional coverage. Other TCAS systems provide duplicate directional antennas top and bottom. U.S. Pat. No. 5,552,788, Antenna Arrangement And Aircraft Collision Avoidance System, issued Sep. 3, 1996, the complete disclosure of which is incorporated herein by reference, teaches an arrangement of four standard monopole antenna elements, for example, ¼ wavelength transponder antennas, arranged on opposing surfaces of one axis of the aircraft at the extremes of two mutually orthogonal axes to avoid shadowing and provide directional information about the received reply signal. For example, two monopole antennas are preferably mounted on a longitudinal axis of the aircraft and two additional monopole antennas are preferably mounted on a lateral axis of the aircraft orthogonal to the longitudinal axis passing through the first two antennas. Directionality is determined by comparing the power levels of the received signals. Additionally, the '788 patent teaches a TCAS system which can transmit transponder interrogation signals directionally using predetermined ones of the monopole antennas, thus eliminating dependence upon ground based radar systems for interrogating threat aircraft transponders.

Other antennas for directionally transmitting TCAS system transponder interrogation signals are also commercially available. For example, a TCAS system-compatible directional antenna is commercially available from AlliedSignal Incorporated of Redmond, Wash., under the part number ANT 81A.

Although the ATCRBS/Mode-S surveillance system and the TCAS collision avoidance system are separate, the TCAS processor accounts for the data provided by the intruder aircraft to determine what evasive maneuver to recommend to the host aircraft's pilot, i.e., whether to recommend that the pilot maintain current altitude, ascend or descend. The TCAS system also uses the inter-aircraft data link provided by the addressable Mode-S transponder to coordinate the recommended evasive maneuver with a TCAS equipped intruder aircraft. Furthermore, a connection between the TCAS and Mode-S transponters and other avionics on an aircraft allows coordination between the TCAS and Mode-S transponders. This intersystem connection is often used to prevent simultaneous transmissions which could interfere with the system's independent functions or cause equipment damage.

As briefly described above and described in detail in the respective RTCA specifications, DO-181A and DO-185A, the ATCRBS/Mode-S surveillance and TCAS collision avoidance systems are separate. The most basic installations require at least a TCAS processor, a Mode-S transponder, and two sets of independent and dedicated antennas. For example, U.S. Pat. No. 5,077,673, Aircraft Traffic Alert And Collision Avoidance Device, issued Dec. 31, 1991, describes a host aircraft having both an ATCRBS surveillance device and an aircraft traffic alert and collision avoidance device installed thereon, each of the ATCRBS surveillance device and an aircraft traffic alert and collision avoidance device having an antenna dedicated to supporting the respective independent function. U.S. Pat. No. 5,552,788 suggests using four dedicated monopole antennas to support just the an aircraft traffic alert and collision avoidance device. These redundant antennas are costly and add unnecessary weight to the aircraft. The omnidirectional nature of each of the Mode-S "squitter" and the Mode-S reply transmission require large amounts of transmission power and crowd the spectrum with additional RF transmissions, thereby degrading the RF interference environment. Although RTCA documents have suggested the possibility of a combined TCAS/Mode-S system, to date no enabling disclosure has been made and no product embodying such a combined TCAS/Mode-S system has been either used or offered for sale. Furthermore, no publication to date has suggested a combined TCAS/Mode-S system wherein both functions share common antennas.

SUMMARY OF THE INVENTION

The present invention overcomes the limitations of the prior art by providing a method for transmitting a directional reply signals in response to Air Traffic Control Radar Beacon System and Mode Select signals interrogation signals. The method includes configuring two directional antennas to independently acquire an interrogation signal; receiving an acquired interrogation signal; and determining a directional source of the received interrogation signal. The method then provides for configuring a configurable switch to couple a transponder transmitter to one of the two directional antennas and transmitting a directional radiation pattern toward the determined vertical and the determined azimuthal directional source of the received interrogation signal. The directional radiation pattern is preferably a Mode Select waveform and further includes a Mode-A identification signal and a Mode-C altitude signal. The method alternately configures the configurable switch to acquire the interrogation signal on one and then the other of the two directional antennas, whereby the method determines the vertical directional source of the received interrogation signal by determining the relative strength of the signals received on each of the two antennas.

According to one aspect of the invention, the two directional antennas each include multiple directional antenna elements, and the method determines the azimuthal source of the received interrogation signal by determining the relative strength of the received interrogation signal acquired by different ones of multiple directional antenna elements. The relative strength of the received interrogation signal acquired by different ones of multiple directional antenna elements is determined by determining the relative induced signal amplitudes at each of the directional antenna elements. Alternatively, the azimuthal source is determined using phase interferometry.

According to another aspect of the invention, the method receives the acquired interrogation signal into a Mode Select transponder receiver coupled to the configurable switch. The Mode Select transponder receiver provides a signal to a transmit and switch control function which, in response to that signal, provides a configuration signal to the configurable switch to transmit the reply signal the one antenna element having the strongest reception. Thus, the reply signal is transmitted on the antenna element most exposed to the interrogation signal source and, therefore, the reply signal is transmitted toward the source. Alternatively, the directional beam or transmission pattern is formed by delivering power to all of the elements in the antenna and modifying the phase at each element with respect to the phases of each other antenna element. The phase is shifted to combine the signals from all of the antenna elements in the direction of the source and cancel the signals in other directions. Because the reply signal is transmitted only toward the source of the interrogation signal, energy is not wasted on transmitting signals in other directions and interference in the ATC environment is reduced.

The reply signal is, preferably, a Mode Select waveform, including a unique address code.

According to other aspects of the present invention, an airborne directional transponder device is provided for detecting and responding to Air Traffic Control Radar Beacon System format interrogation signals using a pair of directional antennas. The device of the invention includes two first and second individually addressable directional antennas with a switch coupled to of each the antennas. A transponder receiver is coupled to the switch for receiving and decoding an interrogation signal. The transponder receiver includes a circuit for determining the direction of the source of a received interrogation signal relative to the interrogated host aircraft. A transmitter, coupled to the switch, transmits a signal in response to the received and decoded interrogation signal. A transmit and switch control circuit couple the switch to a one of the two individually addressable directional antennas for transmitting the response signal toward relative direction of the source of the received interrogation signal.

The directional transponder device is responsive to an Air Traffic Control Radar Beacon System format interrogation signal.

According to one aspect of the invention, the circuit for determining a relative directional source of a received interrogation signal includes a circuit for determining the relative signal strength of the received interrogation signal acquired at each of the two antennas. Optionally, each of the first and second directional antennas is formed with multiple individually addressable antenna elements, and the circuit for determining a relative directional source of a received interrogation signal includes a circuit for determining the relative strength of the interrogation signal acquired at each of the several individually addressable antenna elements. The relative signal strength at each of the individually addressable antenna elements is determined by a circuit for determining the relative induced signal amplitudes at each of the individually addressable directional antenna elements. Alternatively, each of the first and second directional antennas is formed with multiple antenna elements, and the circuit for determining a relative directional source of a received interrogation signal includes a circuit for determining the relative phase of the incoming interrogation signal at each of the antenna elements using phase interferometry.

According to yet another aspect of the invention, the two directional antennas are spaced apart from one anther on opposing surfaces of a host aircraft.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 11 illustrates components of a beam forming network used in the directional antenna of FIG. 10;

FIG. 12 illustrates the operation of the power dividing component used in the beam forming network illustrated in FIG. 11.

DETAILED DESCRIPTION OF THE PREFERRED EMBODIMENTS

Figure 1:
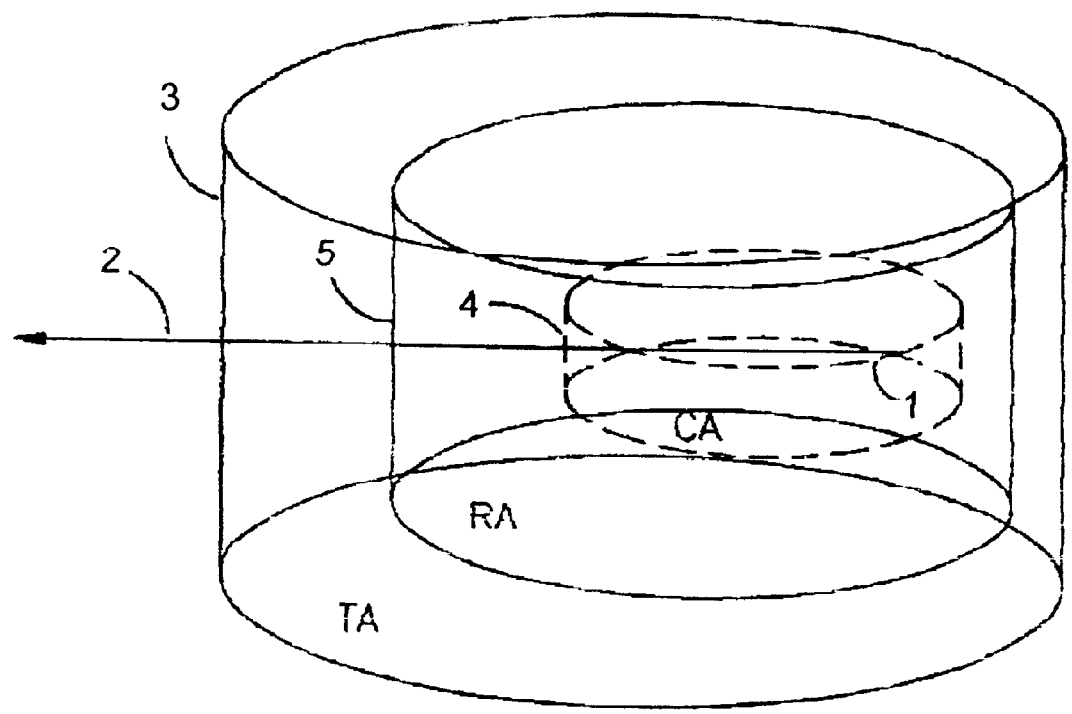
FIG. 1 illustrates the warning zones typically used by a modern Traffic Alert and Collision Avoidance or TCAS system.

FIG. 1 illustrates the warning zones typically used by a modern Traffic Alert and Collision Avoidance or TCAS system, as described in U.S. Pat. No. 5,629,692, Method And Apparatus For Alerting Pilot To Transponder Antenna Failure In A Traffic Alert And Collision Avoidance System, issued May. 13, 1997, the complete disclosure of which is incorporated herein by reference. FIG. 1 depicts a host aircraft 1 moving along a flight path indicated by vector 2. A first large volume of 3-dimensional airspace or "caution area," surrounding but biased primarily in front of host aircraft 1 along flight path 2, is identified by generally oblong cylinder 3 labeled as the "traffic alert" or TA zone. TA zone 3 defines a time zone prior to which an intruder aircraft is predicted to enter a second, smaller volume of 3-dimensional airspace around host aircraft 1, identified by second inner generally oblong cylinder 4 labeled as the "collision area" or CA zone. TA zone 3 begins approximately 20 to 48 seconds, depending upon the speed and trajectory of the intruder aircraft relative to host aircraft 1, before the intruder aircraft enters CA zone 4 of host aircraft 1. The TCAS system provides visual and/or aural warnings and indication when an intruder aircraft is about to enter or has entered TA zone 3, as will be explained in detail below. A third volume of 3-dimensional airspace or "warning area," smaller than TA zone 3 and larger than CA zone 4 is identified by another generally oblong cylinder 5 referred to as the "resolution advisory" or RA zone. RA zone 5 defines a second time zone beginning approximately 15 to 35 seconds prior to which an intruder aircraft is predicted to enter CA zone 4. The TCAS system provides visual and/or aural warnings and indication when an intruder aircraft is about to enter or has entered RA zone 5, as will also be explained in detail below.

Figure 2:
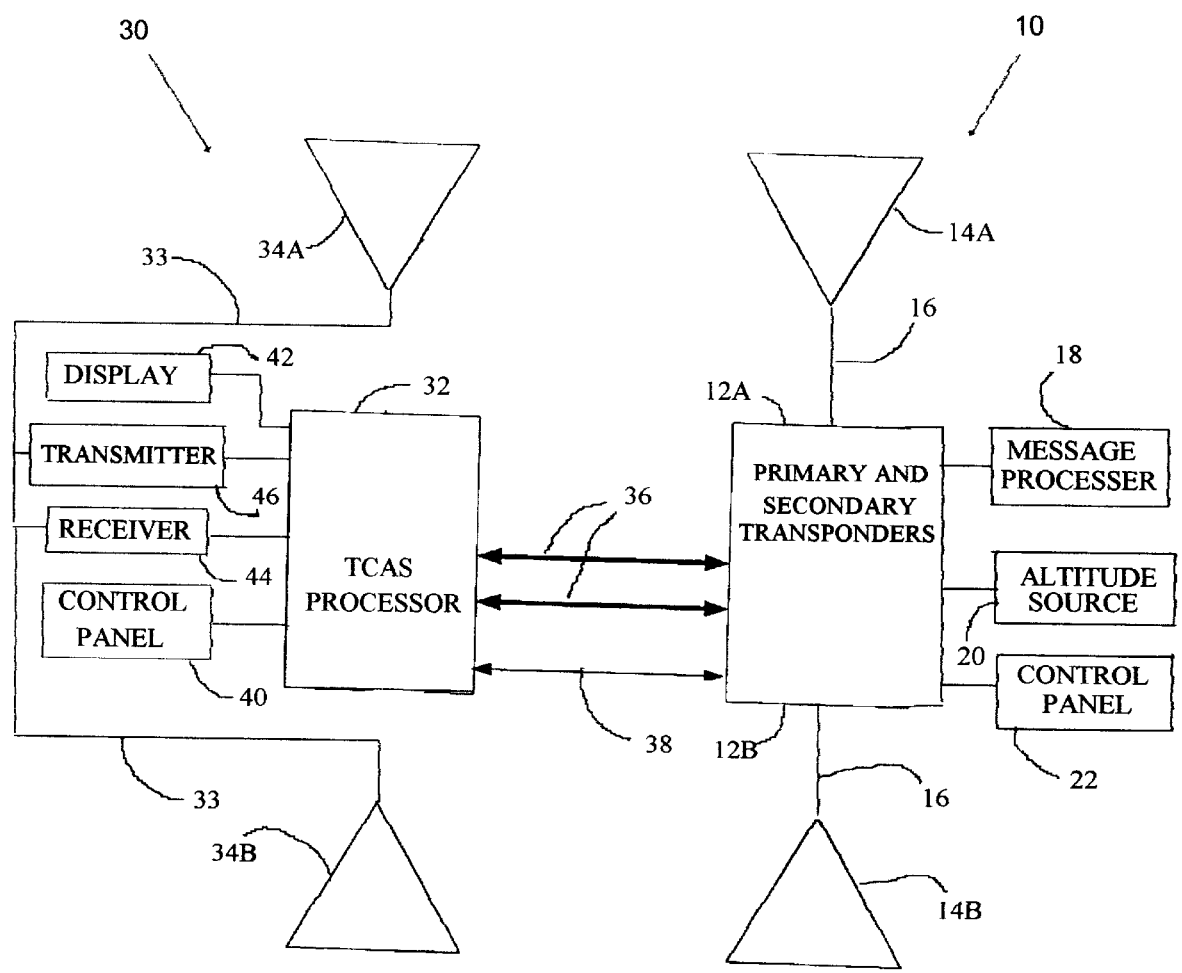
FIG. 2 illustrates the separate airborne Air Traffic Control Radar Beacon System/Mode-Select (ATCRBS/Mode-S) surveillance system and Traffic Alert and Collision Avoidance (TCAS) collision avoidance systems of the prior art and the prior art interconnection between the two separate systems.

FIG. 2 illustrates the separate airborne Air Traffic Control Radar Beacon System/Mode-Select or ATCRBS/Mode-S surveillance system and Traffic Alert and Collision Avoidance or TCAS collision avoidance system of the prior art, and the prior art interconnection between the two separate systems. In FIG. 2, ATCRBS/Mode-S system 10 includes a primary transponder 12A and a secondary or back-up transponder 12B and two dedicated transponder antennas 14 coupled to transponders 12 by cables 16. Each transponder antenna 14 is a single element or omni-blade omnidirectional antenna operating in the L-band and broadcasting an omnidirectional signal. Attenuation of the received transponder signals by the airframe shadowing the antenna from the SSR ground station transmitter is usually avoided by locating the two antennas 14 in spaced apart locations on the aircraft, usually on a top surface and a bottom surface of the aircraft. Complementary to the ground based Secondary Surveillance Radar or SSR (not shown) of the Air Traffic Control Radar Beacon System (ATCRBS) located at each of a plurality of Air Traffic Control (ATC) stations, transponder 12 drives one of transponder antennas 14 to spontaneously and pseudo-randomly transmit (squit) an unsolicited broadcast, including a specific address code unique to the aircraft carrying the transponder, commonly termed a "squitter," in an omnidirectional pattern, as described in detail in connection with FIG. 5 below. Whenever ATCRBS/Mode-S transponder 12 is not broadcasting, it is monitoring, or "listening," for transmissions simultaneously on both dedicated omnidirectional antennas 14. The transmit and receive modes of transponder 12 are mutually exclusive to avoid damaging the equipment. Each ground based Mode-S interrogator broadcasts a coded 1030 MHz microwave interrogation signal "All-Call" interrogation signal which has a waveform that can be understood by both ATCRBS and Mode-S transponders. Transponder 12 is capable of receiving interrogation signals broadcast at 1030 MHz. When an aircraft equipped with ATCRBS/Mode-S transponder 12 enters the airspace served by an ATC Mode-S interrogator, transponder 12 receives and interprets the interrogation signal.

Transponder 12 is optionally coupled to a message processor 18. Message processor 18 generates a "confidence string" to represent the quality of the received interrogation signal, wherein "quality" refers to the precision of the bit-by-bit decisions provided by message processor 18 as described in detail in U.S. Pat. No. 5,528,244, Processing For Mode S Signals Suffering Multipath Distortion, issued Jun. 18, 1996, the complete disclosure of which is incorporated herein by reference. Briefly, the Mode-S interrogation signal transmitted in a series of data bit pulses one microsecond long, including a ½ microsecond message pulse followed by a ½ microsecond space. A confidence bit is produced for each bit pulse in the received microwave interrogation signal. A confidence count of "1" represents a high quality transmission and is assigned when the amplitude of the ½ microsecond message pulse is within a specified range and the ½ microsecond space has no energy greater than a threshold reference value. The confidence count for each bit in the message is grouped in serial fashion to develop a "confidence count string" which is further processed to determine a confidence value. A message with a low confidence value is discarded while a message with a high confidence value is decoded, corrected and interpreted. Transponder 12 replies to the Mode-S interrogation signal by driving one of antennas 14 to transmit a 1090 MHz microwave Mode-S format reply signal that includes its unique 24-bit address code, or identity tag, back to the SSR ground site. In order to respond to Mode-C interrogations requesting altitude information, transponder 12 is coupled to an altitude source 20, for example, a blind encoding altimeter, as described in U.S. Pat. No. 5,077,673, Aircraft Traffic Alert And Collision Avoidance Device, issued Dec. 31, 1991, the complete disclosure of which is incorporated herein by reference. Blind encoding altimeter 20 measures the barometric pressure and provides a digital signal to transponder 12 representing the pressure altitude of the aircraft. This pressure altitude information is subsequently encoded and transmitted in response to a Mode-C interrogation as a Mode-C reply. A control panel 22 coupled to transponder 12 provides means for the aircraft's crew to configure the functions of transponder 12. Control panel 22 also provides means to prepare and transmit additional information or messages to the ground based SSR, other than the aforementioned identification and altitude information, and to receive such messages transmitted by the ground based SSR via the downlink provided by the ATCRBS/Mode-S system. ATCRBS/Mode-S system 10 is described in greater detail in publication *Mode Select Beacon System* (*Mode-S*) *Sensor*, available from the U.S. Department of Transportation, Federal Aviation Administration, Specification Number FAA-E-2716, amendment 2, dated Mar. 2, 1983, which is incorporated herein by reference in its entirety.

FIG. 2 also illustrates TCAS collision avoidance system 30 which includes a TCAS processor 32 coupled via cables 33 to two dedicated 4-element directional TCAS antennas 34A and 34B. While TCAS antennas 34 are separate and independent from transponder antennas 14 of ATCRBS/Mode-S system 10, TCAS antennas 34A and 34B are also usually mounted on top and bottom surfaces of the aircraft to avoid attenuation of the received transponder signals by the airframe blocking the antenna from the transmitter. Thus, upper antenna 34A is mounted on an upper surface of host aircraft 1 (shown in FIG. 1) and lower antenna 34B is mounted on a lower surface of host aircraft 1. A connection via a standard ARINC 429 communication link 36 between TCAS 30 and transponders 12A and 12B of ATCRBS/Mode-S system 10 and other avionics on host aircraft 1 that transmit in the L-band exists to allow coordination between the TCAS 30 and transponders 12A and 12B. This intersystem connection is also used to prevent simultaneous transmissions which could interfere with the system's independent functions or cause equipment damage. Most modem transponders respond to suppression signals in accordance with published standards. When a proper suppression pulse is supplied to transponder 12 over suppression line 38 connected between TCAS system 30 and ATCRBS/Mode-S system 10, the receiver portion of transponder 12 is disabled so that transponder 12 does not generate reply signals to, except the aforementioned "squitters". This suppression feature prevents interference by other equipment, such as distance measuring equipment (DME). Typically, the suppression input is AC coupled to transponder 12, with a time constant of about 5 milliseconds. This time constant limits the effective suppression period to about 2 milliseconds, as described in above incorporated U.S. Pat. No. 5,077,673. Suppression input is DC coupled to some transponders, and some transponders do not have provisions for suppression. TCAS system 30 typically requires the on-board transponder to have some means for suppression. The newer TCAS II system, for example the TCAS II system sold by Honeywell, Incorporated, typically has several modes of operation selectable via a control panel 40 coupled to TCAS processor 32. Control panel 40 is also coupled to transmit control signals to TCAS processor 32. The function of control panel 40 is described in detail in connection with FIG. 4 below. TCAS processor 32 is also coupled provide an output signal to one or more displays 42. The function of display 42 is described in detail in connection with FIG. 3 below.

In the TCAS II block diagram shown in FIG. 2, a receiver 44 is coupled to receive signals from each of TCAS antennas 34A and 34B by cables 33. Receiver 44 is couple to relay the received signals to TCAS processor 32. TCAS processor 32 is also coupled to drive a transmitter 46 which is in turn coupled via additional cables 33 to each of TCAS antennas 34A and 34B. TCAS processor 32 causes transmitter 46 to drive one of top and bottom TCAS antennas 34A, 34B to produce and broadcast an omnidirectional 1030 MHz microwave transmission interrogation signal at 1030 MHz, the same frequency used by ground based SSR stations to interrogate ATCRBS/Mode-S transponders. Whenever transponder 12 of ATCRBS/Mode-S system 10 is not broadcasting, TCAS system 30 is "listening" on either one of the two directional TCAS antennas 34A and 34B to intercept transponder "squitters" and reply transmissions at 1090 MHz, the same frequency used by airborne ATCRBS/Mode-S transponders to reply to ground based SSR generated interrogation signals. ATCRBS/Mode-S transponders carried by target aircraft reply to the TCAS 1030 MHz interrogation signal as if to an interrogation signal generated by a ground based SSR, supplying the target aircraft's identification and altitude information. Typically, TCAS collision avoidance system 30 also detects target aircraft equipped only with a Mode-A transponder, but will lack altitude information for the target aircraft.

TCAS processor 32 receives and decodes the 1090 MHz microwave reply signals from each of the one or more interrogated transponders via its connection to receiver 44, the reply signals generally include Mode-A identification information, Mode-C altitude information and Mode-S reply format that includes a unique 24-bit address code, or identity tag, if available. TCAS processor 32 determines threat potential of responding aircraft using range, bearing and altitude information. Altitude information is supplied in the target aircraft's Mode-C reply signal. Range is either estimated approximately based on the strength of the received transponder signal or calculated more accurately based on the time delay between transmission of the interrogation signal and reception of the reply signal. Relative bearing information is generally based on angle of arrival information provided by 4-element directional TCAS antenna 34. TCAS processor 32 determines evasive action, i.e., whether to maintain current altitude, ascend or descend, and recommends the proper maneuver to the host aircraft's pilot. TCAS processor 32 also uses the inter-aircraft data link provided by the addressable Mode-S transponder to coordinate the recommended evasive maneuver with a TCAS equipped intruder aircraft.

Display

Figure 3:
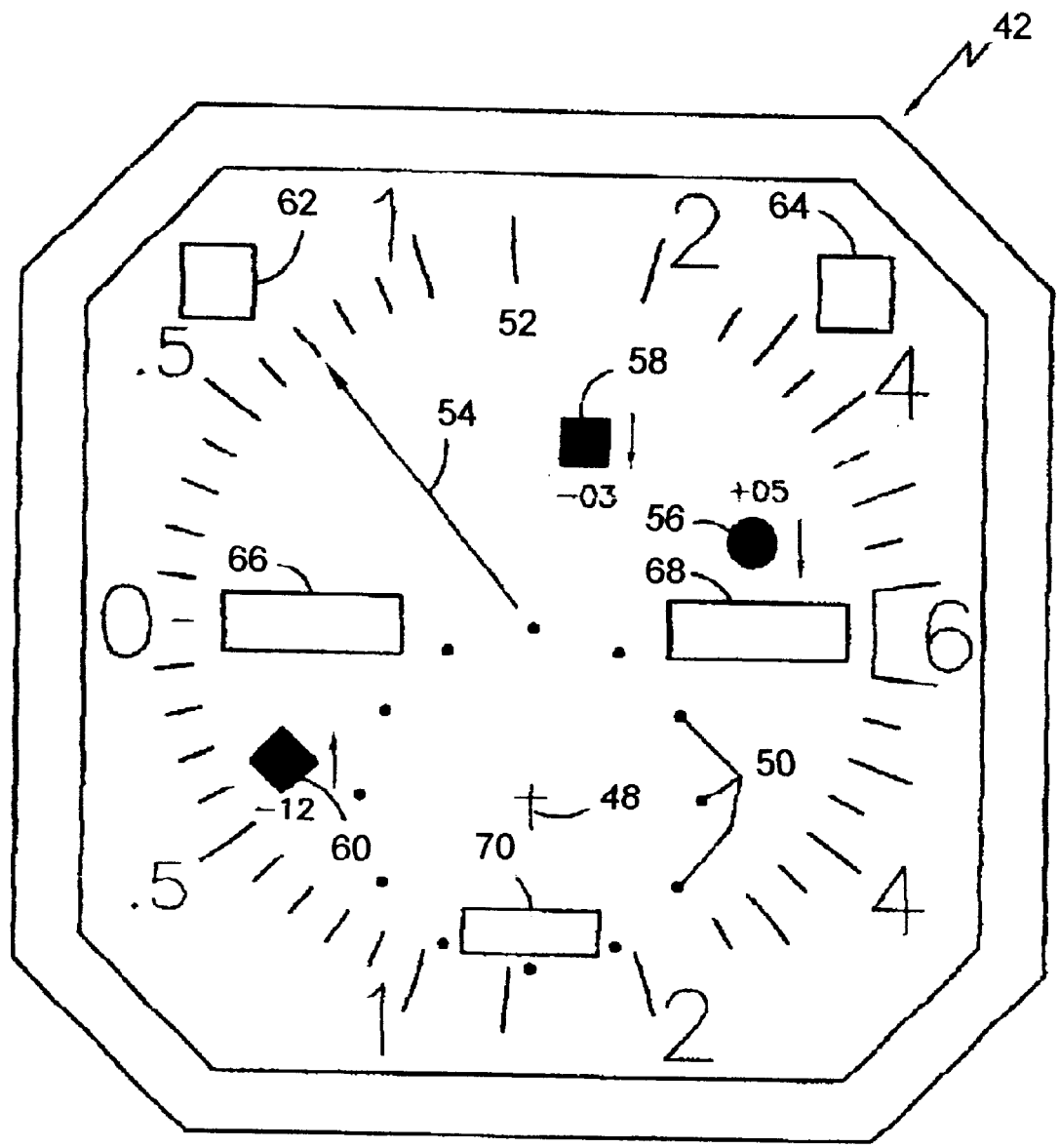
FIG. 3 shows one configuration of a display used with the prior art Traffic Alert and Collision Avoidance (TCAS) system.

FIG. 3 shows one configuration of display 42 used with TCAS collision avoidance system 30. Display 42 includes an aircraft symbol 48 to depict the position of host aircraft 1 of FIG. 1. A circle, formed by multiple dots 50 surrounding host aircraft position symbol 48, indicates a 2 nautical mile range from host aircraft 1. Generally, semi circular indicia 52 around the periphery of indicator display 42 an a rotatable pointer 54 together provide an indication of the rate of change of altitude of host aircraft 1. Indicia 52 are typically marked in hundreds of feet per minute. The portion indicia 52 above the inscriptions "0" and "6" indicates rate of ascent while the portion below indicates rate of descent.

Other target aircraft or "intruders" are identified on display 42 by indicia or "tags" 56, 58 and 60. Tags 56, 58, 60 are shaped as circles, diamonds or squares and are color coded (not shown) to provide additional information. Square 58 colored red represent an intruder entering warning or RA zone 5 of FIG. 1 and suggests an immediate threat to host aircraft 1 with prompt action being required to avoid the intruder. Circle 56 colored amber represents an intruder entering caution or TA zone 3 of FIG. 1 and suggests a moderate threat to host aircraft 1 recommending preparation for intruder avoidance. Diamond 60 represents near or "proximate traffic" when colored solid blue or white and represents more remote traffic or "other traffic" when represented as an open blue or white diamond. Air traffic represented by either solid or open diamond 60 is "on file" and being tracked by TCAS processor 32.

Each indicia or tag 56, 58, 60 is accompanied by a two digit number preceded by a plus or minus sign. In the illustration of FIG. 1 for example, a "+05"is adjacent circle tag 56, a "−03"is adjacent square tag 58 and a "−12"is adjacent diamond tag 60. Each tag may also have an vertical arrow pointing either up or down relative to the display. The two digit number represents the relative altitude difference between host aircraft 1 and the intruder aircraft, the plus and minus signs indicating whether the intruder is above or below host aircraft 1. Additionally, the two digit number appears positioned above or below the associated tag to provide a visual cue as to the intruder aircraft's relative position: the number positioned above the tag indicates that the intruder is above host aircraft 1 and the number positioned below the tag indicates that the intruder is below host aircraft 1. The associated vertical arrow indicates the intruder aircraft's altitude is changing at a rate in excess of 500 feet per minute in the direction the arrow is pointing. The absence of an arrow indicates that the intruder is not changing altitude at a rate greater than 500 feet per minute.

Display 42 includes several areas represented by rectangular boxes 62, 64, 66, 68, 70 which are areas reserved for word displays wherein conditions of TCAS system 30 are reported to the host aircraft pilot. For example, if a portion or component of TCAS system 30 fails, a concise textual report describing the failure appears in one of rectangular boxes 62, 64, 66, 68, 70. In another example, if the operator uses control panel 40 to select one of a limited number of operational modes, a concise textual message indicating the choice of operational mode appears in another of rectangular boxes 62, 64, 66, 68, 70. Selectable operational modes typically include a "standby" mode in which both host aircraft transponder systems 12 are inactive, a "transponder on" mode in which a selected one of primary transponder 12A and secondary transponder 12B is active, a "traffic alert" mode in which an alert is transmitted to the host aircraft pilot if any Mode-C or Mode-S transponder equipped aircraft are entering a first predetermined cautionary envelope of airspace, and a "traffic alert/resolution advisory" mode in which an alert is issued if any Mode-C or Mode-S transponder equipped aircraft are entering a second predetermined warning envelope of airspace. The various operational modes described above are selectable using control panel 40.

Control panel

Figure 4:
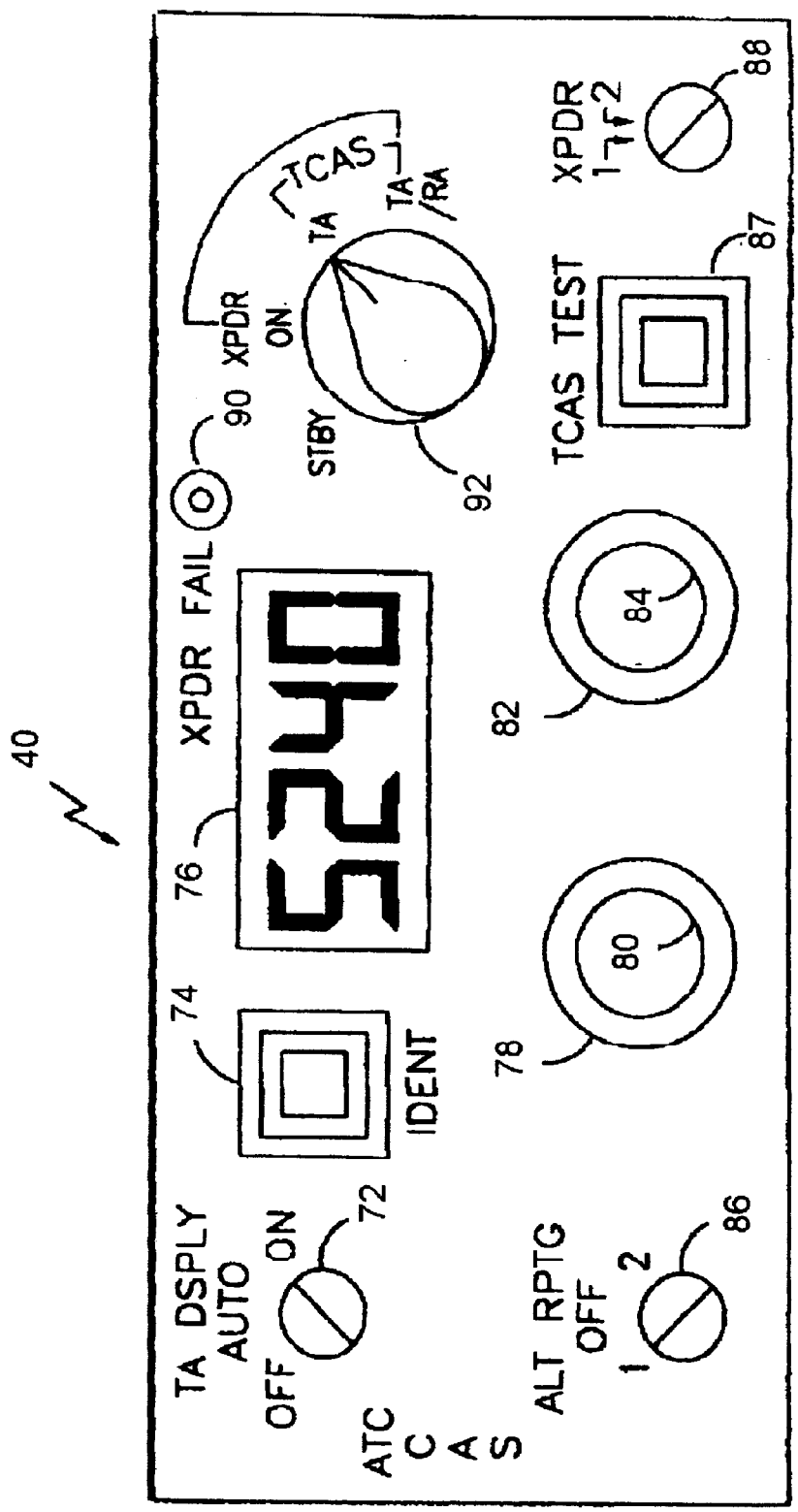
FIG. 4 illustrates one configuration of a control panel for use with the dual transponder airborne Air Traffic Control Radar Beacon System/Mode-Select (ATCRBS/Mode-S) surveillance system of the prior art.

FIG. 4 illustrates one configuration of control panel 40 for use with the dual transponder system described herein. Control panel 40 includes a traffic avoidance display switch 72 in the upper left corner which activates the display by switching from an "off" condition to either an "auto on" or an "on" condition. A push to activate-type switch 74 controls transponders 12 and allows the operator to specifically identify host aircraft 1 to a receiving SSR ground station when requested. A center display 76 shows the host aircraft's identification code which is operator selectable utilizing four knob-type switches 78, 80, 82 and 84 located below display 76. The selected code is automatically broadcast and permits ground based SSR receivers and other TCAS equipped aircraft in the vicinity to identify host aircraft I on their display screens. Three positions switch 86 in the lower left corner of control panel 40, when switched from an "off" position, provides the operator with a selectable choice of two sources of altitude information to be broadcast to ground based SSR receivers and other TCAS equipped aircraft. The selectable choices include, for example, the pilot's altimeter (not shown) or the co-pilot's altimeter (not shown). The "off" position on three positions switch 86 permits the operator to stop broadcasting this information if so requested to reduce clutter under crowded conditions or to eliminate erroneous altitude reports when the information supplied is incorrect. A TCAS TEST push-type switch 87 causes display 42, shown in FIG. 3, to produce predetermined symbols similar to symbols 56, 58 and 60 which permits the operator to determine that TCAS system 30 is operating to produce proper symbolism for intruder aircraft. Two position switch 88 in the lower right corner of control panel 40 permits the operator to select either primary transponder 12A or secondary transponder 12B to be coupled for transmission on both TCAS antennas 34A and 34B. If a transponder system fails, either transponder 12 or TCAS antenna 34, a small light 90 positioned to the upper right of display 76 is illuminated which provides an indication of failure to the operator. An aural announcement, which is optionally among the various displays of FIG. 2 but not shown, also indicates such failure of TCAS system 30 at the conclusion of a system self-test initiated by depression of TCAS TEST switch 86. If such failure is reported, the operator may position switch 88 to connect the other of transponders 12A and 12B to TCAS antennas 34A and 34B. If selecting the other of transponders 12A and 12B removes the failure, indicator light 90 is extinguished. Else, indicator light 90 remains illuminated until certain conditions are satisfied. Such conditions and results are described in detail in above incorporated U.S. Pat. No. 5,629,692 and are not relevant to the present invention. Briefly, if selecting the other of transponders 12A and 12B does not remove the failure, the operator selects among various TCAS system modes using switch 92 in the upper right corner of control panel 40. The operator can select a "standby" switch position, labeled "STBY," wherein TCAS system 30 is sleeping. The operator can select a "transponder on" switch position, labeled "XPDR ON," wherein TCAS system 30 is activated but not currently monitoring the airspace around host aircraft 1. The operator can select a "traffic alert" switch position, labeled "TA," wherein TCAS system 30 monitors only TA zone 3 (shown in FIG. 1) or a ordinary operation switch position, labeled "TA/RA," wherein TCAS system 30 functions normally and monitors both TA zone 3 and RA zone 5. Thus, TCAS system 30 of the prior art can be configured to operate under various circumstance and equipment conditions.

Figure 5:
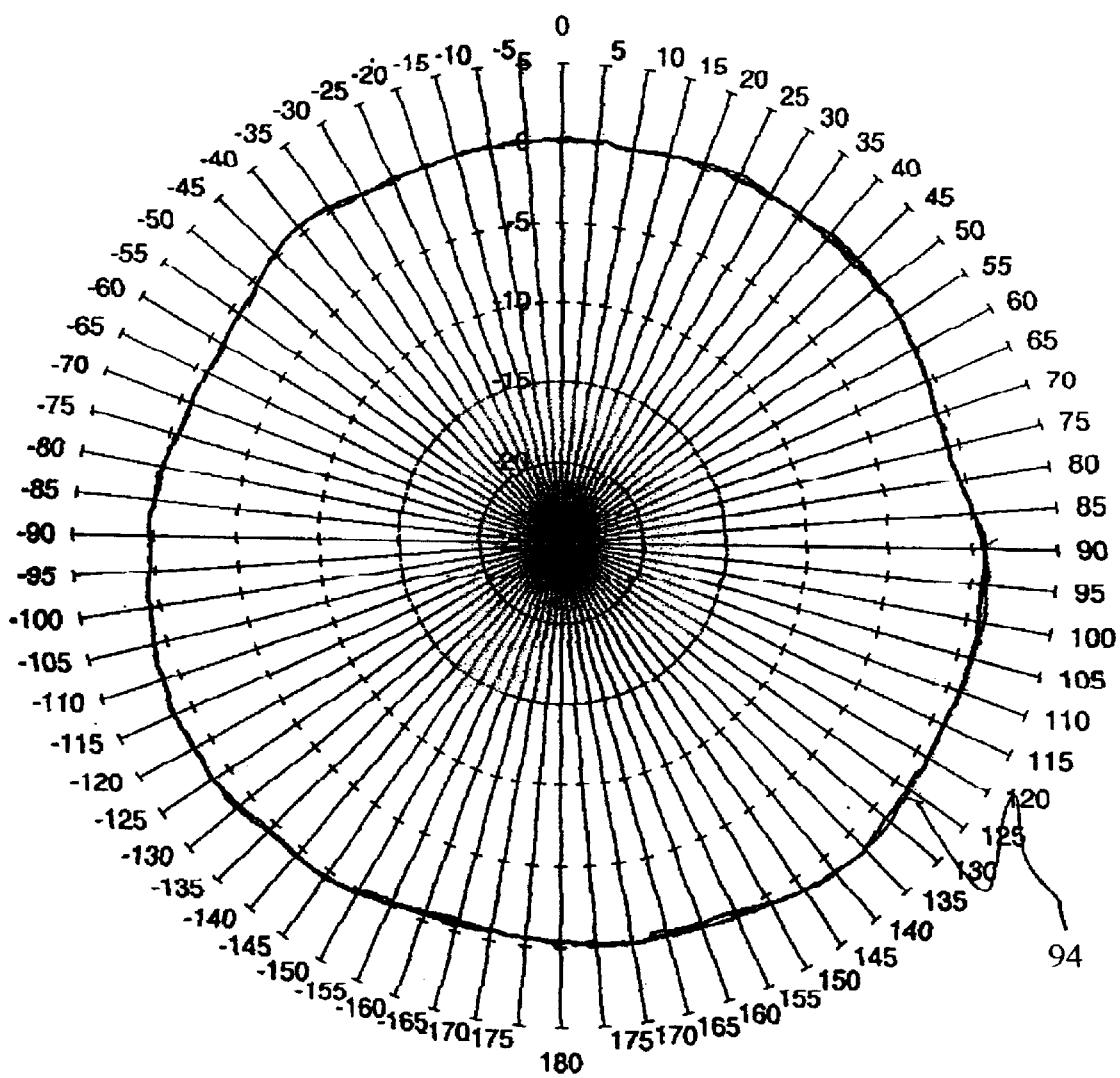
FIG. 5 illustrates the omnidirectional transmission pattern produced by the omnidirectional antenna utilized by the airborne Air Traffic Control Radar Beacon System/Mode-Select (ATCRBS/Mode-S) system of the prior art.

FIG. 5 illustrates the omnidirectional transmission, or radiation, pattern 94 produced by a modern ATCRBS/Mode-S single element antenna 14, shown in FIG. 2.

Figure 6:
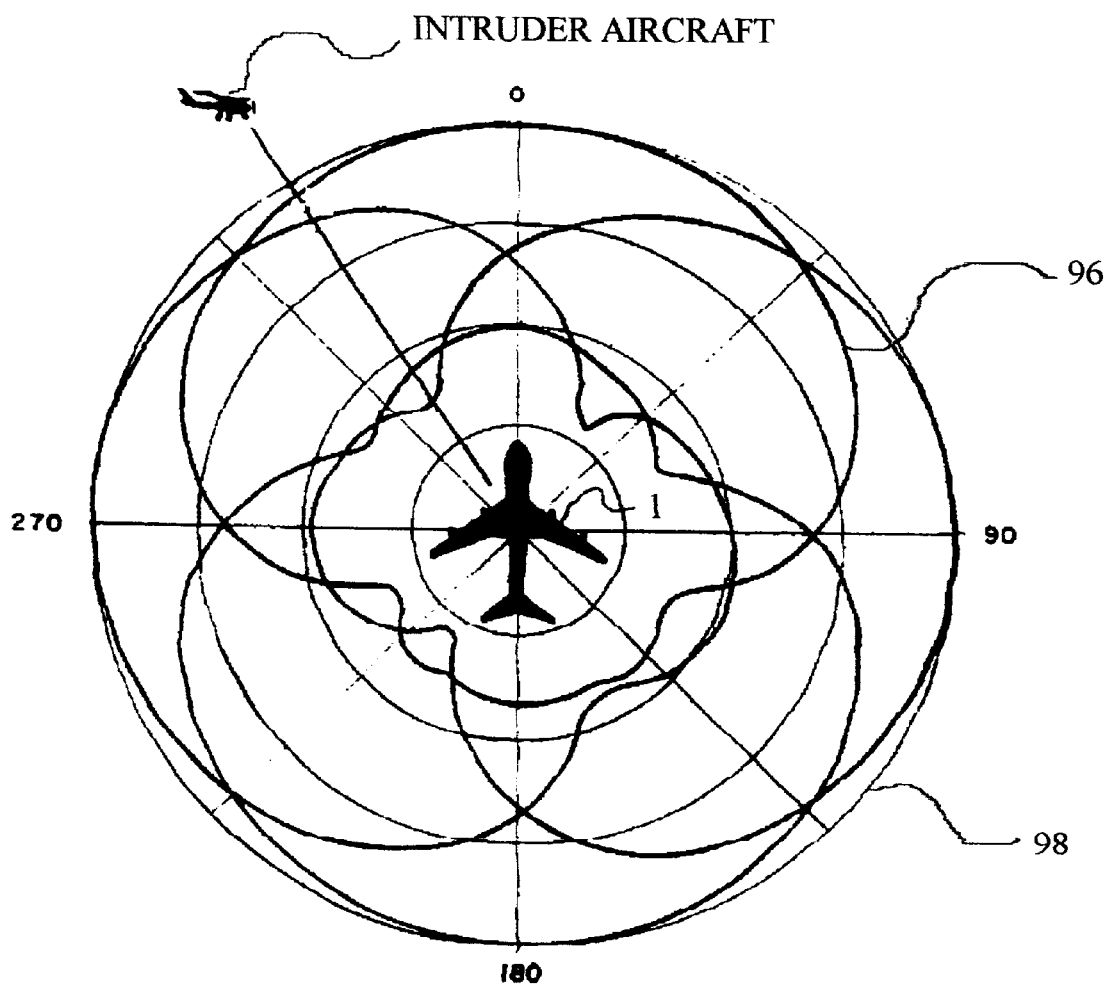
FIG. 6 illustrates both the omnidirectional transmission pattern and one of the four directional transmission patterns produced by the prior art Traffic Alert and Collision Avoidance (TCAS) system.

FIG. 6 illustrates the omnidirectional 96 transmission, or radiation, pattern produced by a modem TCAS system 30, shown in FIG. 2. FIG. 6 also illustrates one of the four directional TCAS transmission, or radiation, patterns 98, a forwardly broadcast transmission, or radiation, pattern is shown as an example.

Combined TCAS Transponder Device

Figure 7:
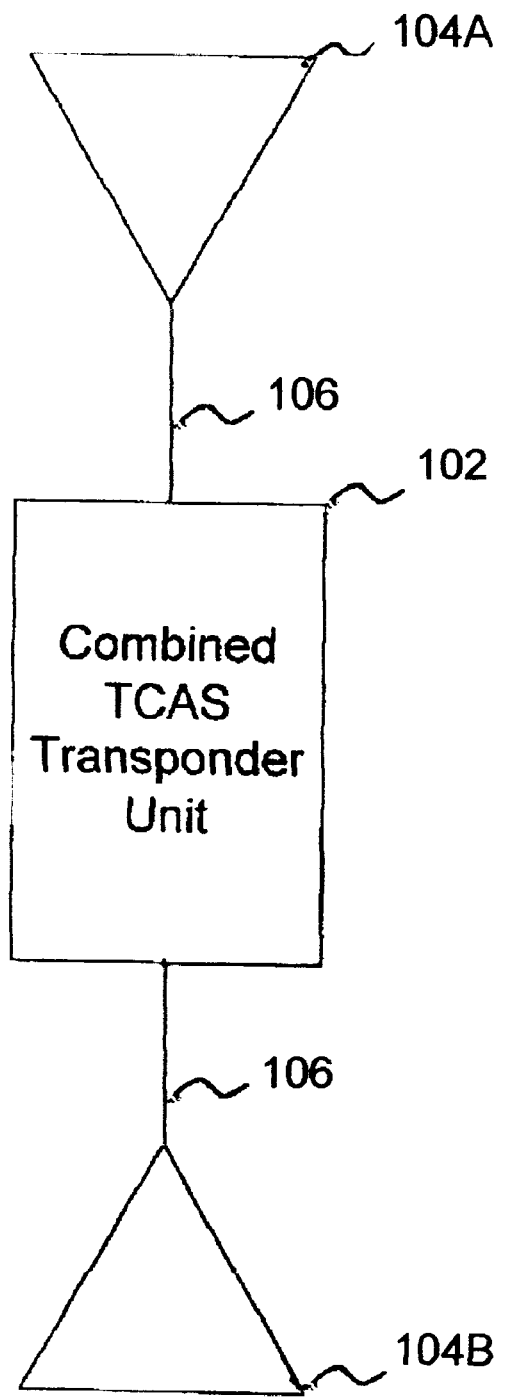
FIG. 7 illustrates a high level block diagram of the combined airborne Air Traffic Control Radar Beacon System/Mode-Select (ATCRBS/Mode-S) surveillance system and Traffic Alert and Collision Avoidance (TCAS) collision avoidance system device of the present invention.
Figure 8:
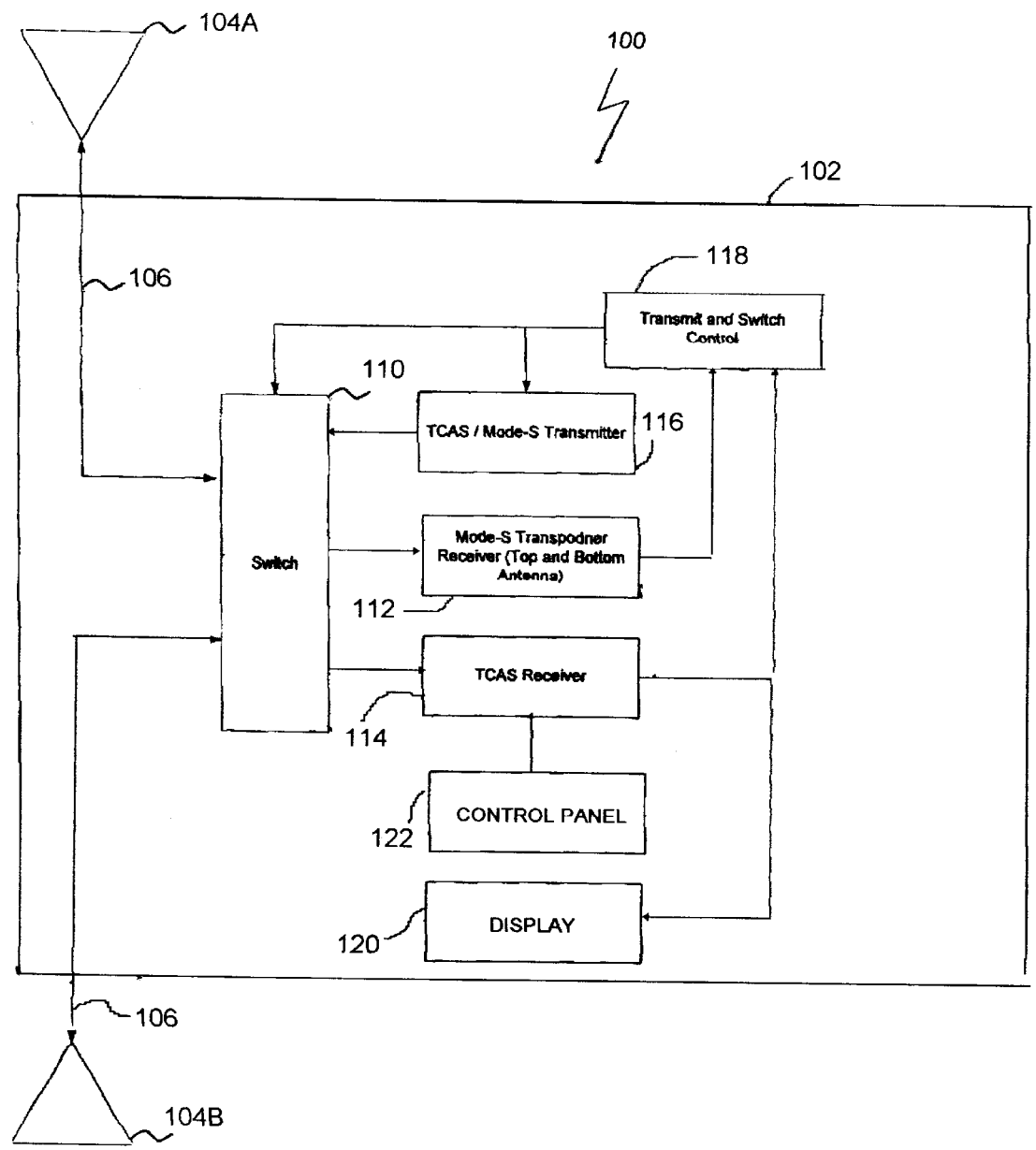
FIG. 8 illustrates a more detailed block diagram of the combined airborne Air Traffic Control Radar Beacon System/Mode-Select (ATCRBS/Mode-S) surveillance system and Traffic Alert and Collision Avoidance (TCAS) collision avoidance system device of the present invention shown in FIG. 7, including a switch coupling the common antennas to the relevant functions of the combined airborne Air Traffic Control Radar Beacon System/Mode-Select (ATCRBS/Mode-S) surveillance system and Traffic Alert and Collision Avoidance (TCAS) collision avoidance system of the present invention.

FIGS. 7 and 8 illustrate the combined TCAS transponder device of the present invention. FIG. 7 is a high level block diagram of the combined TCAS transponder device 100 of the present invention. In FIG. 7, according to one preferred embodiment of the present invention, the ATCRBS/Mode-S function and the TCAS function are co-located in a combined TCAS/transponder processor 102. Combined TCAS transponder device 100 utilizes a single pair of antennas 104 coupled to combined TCAS/transponder processor 102 using cables 106. Attenuation of transponder signals, i.e., either interrogation signals from SSR ground station transmitters and TCAS equipped aircraft or reply signals from a TCAS interrogated aircraft, is usually avoided by locating the two antennas 104 in spaced apart locations on the aircraft, thereby eliminating shadowing the antenna by the airframe. In a preferred embodiment, a first antenna 104A is located on a top surface of the aircraft and a second antenna 104A is located on a bottom surface of the aircraft. Other alternative configurations are known and the present invention contemplates these alternative configurations without limitation. For example, first and second antennas 104A and 104B are sometimes located fore and aft on the aircraft, rather than top and bottom. Antennas 104 are four element, or four blade, directional antenna. According to the present invention, the ATCRBS/Mode-S omnidirectional, or omniblade, antennas of the prior art are eliminated in the present invention. Directional antennas 104 of the present invention broadcast both directional and omnidirectional 1030 MHz interrogation signals. Antennas 104 of the present invention are configured to receive and transmit on both 1030 MHz and 1090 MHz, i.e., ATCRBS interrogation and reply frequencies. Antennas 104 are capable of simultaneously receiving and monitoring both ground based SSR and airborne TCAS interrogation signals. Antennas 104 are capable of transmitting reply signals in response to such interrogation signals and of transmitting interrogation signals from host aircraft 1, shown in FIG. 1. Accordingly, antennas 104 are capable of both receiving interrogation signals transmitted at 1030 MHz and transmitting reply signals at 1090 MHz which is standard operational mode of the ATCRBS/Mode-S surveillance system. Antennas 104 are also capable of transmitting interrogation signals at 1030 MHz to target aircraft and receiving the reply signals at 1090 MHz which is the standard operational mode of the TCAS collision avoidance system. Such capability is available in a conventional four-element directional antenna as is used in current TCAS collision avoidance systems as described in detail below.

The transponder receive function of a combined TCAS processor/transponder processor 102 utilizes the directional and locational information provided by antennas 104 to determine the directional source of an interrogation signal. Accordingly, the transponder receive function determines which of top antenna 104A and bottom antenna 104B received the interrogation signal and from which direction, i.e., left, right, fore or aft, the strongest interrogation signal is received. The host aircraft 1 transponder transmits a directionally oriented reply signal toward the source of the interrogation signal using top antenna 104A or bottom antenna 104B on which the interrogation signal was received. Thus, in contrast to the transponder of the prior art, the transponder of the present invention reduces the transmission power by focusing the reply signal in a single direction. Such focuses signal reduces the amount of transmission power the host aircraft must generate and reduces the amount of interference in the 1090 MHz reply signal bandwidth resulting from replies being transmitted in an omnidirectional pattern.

FIG. 8 illustrates a more detailed block diagram of a combined TCAS processor/transponder processor 102 of the present invention. In FIG. 8, a switch 110 connects a dual Mode-S transponder signal receiver 112, a TCAS receiver 114, and a combination TCAS/Mode-S transmitter 116 to antennas 104. Switch 110 is coupled to receive an input signal from antennas 104 and output the received signal to each of Mode-S transponder signal receiver 112 and TCAS receiver 114. Switch 110 is also coupled to relay a TCAS drive signal from combination TCAS/Mode-S transmitter 116 to drive top and bottom antennas 104A and 104B to output the TCAS signal. Switch 110 is further coupled to relay a Mode-S transponder drive signal generated by combination TCAS/Mode-S transmitter 116 to drive top and bottom antennas 104A and 104B to output the transponder signal. Transmit and switch control circuit or function 118 is coupled to control each of switch 110 and combination TCAS/Mode-S transmitter 116. Transmit and switch control function 118 is coupled to receive a control signal from Mode-S transponder signal receiver 112.

Transmit and switch control 118 configures switch 110 to couple each of top and bottom antennas 104A and 104B to each of Mode-S transponder signal receiver 112, TCAS receiver 114, and combination TCAS/Mode-S transmitter 116 in various transmit and receive modes. In a first receive mode, switch 110 is configured to couple both top and bottom antennas 104A and 104B to Mode-S transponder signal receiver 112 while coupling top antenna 104A to TCAS receiver 114. In a second receive mode, switch 110 is configured to couple both top and bottom antenna 104A and 104B to Mode-S transponder signal receiver 112 while coupling bottom antenna 104B to TCAS receiver 114. In each of the first and second receive modes, Mode-S transponder signal receiver 112 processes signals from both top and bottom antenna 104A and 104B simultaneously, while TCAS receiver 114 processes the signals from each of top and bottom antenna 104A and 104B alternately. In a first transmit mode, switch 110 is configured to couple top antenna 104A to combination TCAS/Mode-S transmitter 116. In a second transmit mode, switch 110 is configured to couple bottom antenna 104B to combination TCAS/Mode-S transmitter 116.

According to the first receive mode, both top and bottom antennas 104A and 104B simultaneously receive, or "listen," omnidirectionally utilizing all four elements of each antenna 104A and 104B. Transmit and switch control 118 configures switch 110 to couple the output of both top and bottom antennas 104 to Mode-S transponder signal receiver 112, whereby combined TCAS transponder device 100 of the present invention receives and monitors ATCRBS/Mode-S 1030 MHz interrogation signals. In the first receive mode, transmit and switch control 118 also configures switch 110 to couple the output of top antenna 104A to TCAS receiver 114, whereby TCAS receiver 114 receives and monitors responses to TCAS interrogation signals broadcast by target aircraft at a frequency of 1090 MHz. According to the second receive mode, both top and bottom antennas 104A and 104B again simultaneously receive, or "listen," omnidirectionally utilizing all four elements of each antenna 104. Transmit and switch control 118 again configures switch 110 to couple the output of both top and bottom antennas 104 to Mode-S transponder signal receiver 112 such that combined TCAS transponder device 100 again receives and monitors ATCRBS/Mode-S 1030 MHz interrogation signals. However, in the second receive mode, transmit and switch control 118 configures switch 110 to couple the output of bottom antenna 104B, rather than the output of top antenna 104A, to TCAS receiver 114 such that TCAS receiver 114 receives and monitors TCAS responses utilizing bottom antenna 104B, rather than the output of top antenna 104A.

The first receive mode alternates with the second receive mode such that Mode-S transponder signal receiver 112 is receiving and monitoring ATCRBS/Mode-S 1030 MHz interrogation signals on both top and bottom antennas 104A and 104B while TCAS receiver 114 alternately monitors 1090 MHz response signals on first one and then the other of top and bottom antennas 104A and 104B. Mode-S transponder signal receiver 112 is configured to detect and decode standard interrogation signals, including Mode-S, Mode-A and Mode-C interrogation signals. Signal attenuation due to shadowing of top and bottom antennas 104 by the host aircraft's airframe blocking the antenna from the transmitter provides a difference in signal strength between the interrogation signals received at each of top and bottom antennas 104A and 104B. Mode-S transponder signal receiver 112 determines the relative vertical direction of a received interrogation signal based on this difference in signal strength of and determines azimuth bearing from comparison of the relative signal strength at the four elements of top or bottom antenna 104, as described in detail below in connection with FIG. 13.

Mode-S transponder signal receiver 112 provides an input signal, including directional information, to transmit and switch control 118. The input signal drives transmit and switch control 118 to send a transmit signal to TCAS/Mode-S transmitter 116 and a switch control signal to switch 110. In response to the received transmit signal, TCAS/Mode-S transmitter 116 generates a reply drive signal which includes the requested information. In response to the switch control signal, switch 110 is configured in one of the first and second transmit modes described above, wherein switch 110 is configured to couple either top antenna 104A or bottom antenna 104B to combination TCAS/Mode-S transmitter 116, depending upon whether the received interrogation signal originated above or below host aircraft 1. Switch 110 is further configured to drive coupled antenna 104A or 104B to transmit either an omnidirectional reply signal, or, preferably, a directed reply signal, or directional radiation pattern, toward the directional source of the received interrogation signal using one of either top antenna 104A or bottom antenna 104B. Alternatively, switch 110 is configured to drive coupled top antenna 104A or bottom antenna 104B to transmit either an omnidirectional interrogation signal, or, preferably, a directed interrogation signal toward the directional source of the received squitter or an earlier received reply signal. The optional directional transmission, or radiation, patterns thus generated by such directed transmissions are similar to directional TCAS transmission, or radiation, transmission patterns 98 illustrated in above described FIG. 6. Transmitting on a predetermined one of top and bottom antenna 1 04A and 104B reduces by one-half the amount of power which must be generated to provide a reply signal and also reduces the amount of RF interference generated by each reply signal. The optional directional transmissions utilizing only one blade or element of top or bottom directional antenna 104 further reduce both the amount of power needed for transmission and the amount of RF interference generated by the transmission by a factor equivalent to the ratio of the directional transmission beamwidth to the beamwidth of an omnidirectional transmission, i.e., 360 degrees.

In compliance with aforementioned RTCA ATCRBS/Mode-S specification DO-181A, once per second, switch 110 is configured to drive first one and then the other of coupled top antenna 104A and bottom antenna 104B to transmit an unsolicited omnidirectional pattern Mode-S "squitter," including the host aircraft's unique address code, using all the elements, or blades, of each directional antenna 104.

As mentioned above, TCAS receiver 114 alternately monitors 1090 MHz response signals on first one and then the other of top and bottom antennas 104A and 104B concurrently with Mode-S transponder signal receiver 112 while combined TCAS transponder device 100 alternates between the first and second receive modes, described above. TCAS receiver 114 is configured to detect and decode standard transponder "squitters" and reply signals. TCAS receiver 114 determines vertical direction and relative bearing, or azimuthal direction, of a target aircraft in the manner mentioned above in connection with Mode-S transponder signal receiver 112 and described in detail below. TCAS receiver 114 is further configured to determine altitude, range and bearing of one or more target aircraft according to known methods based on the transponder reply signal received from each target aircraft. TCAS receiver 114 tracks each detected target aircraft and determines the current and potential threat represented by each of the one or more detected target aircraft. Track data, including range, range rate, relative bearing, relative altitude and rate of change of altitude of a target aircraft, together with the currently specified protected volume around the host aircraft, commonly referred to as TCAS sensitivity, are used by TCAS receiver 114 to determine whether the intruder aircraft is a threat. Each threat aircraft is processed individually to permit selection of the minimum safe resolution advisory based on the track data and coordination with other TCAS-equipped aircraft. TCAS receiver 114 determines evasive action necessary to ensure the safe vertical separation of the host aircraft, i.e., whether to maintain current altitude, ascend or descend, and recommends the proper maneuver to the host aircraft's pilot. The appropriate maneuver is one that ensures adequate vertical separation while causing the least deviation of the host aircraft from its current vertical rate. Currently, the resolution advisories are not intended to increase horizontal separation and therefore do not indicate horizontal escape maneuvers. TCAS receiver 114 optionally uses the inter-aircraft data link provided by the addressable Mode-S transponder to coordinate the recommended evasive maneuver with TCAS equipped intruder aircraft. This coordination procedure ensures that the aircraft resolution advisories are compatible. This coordination procedure is performed before displaying the advisory to the pilot/operator to avoid confusion. TCAS transponder device 100 further includes the capability to communicate with the ground based air traffic control system when a ground based Mode-S sensor is available. TCAS transponder device 100 can provide the Mode-S ground system with the resolution advisories that are displayed to the pilot/operator. These resolution advisories can be displayed to the air traffic control if desired. TCAS transponder device 100 can also receive sensitivity level commands from ground based Mode-S sensors.

As mentioned above, switch 110 is configurable in various transmit modes. In a first transmit mode, switch 110 is configured by transmit and switch control 118 to couple combination TCAS/Mode-S transmitter 116 to top antenna 104A. In a second transmit mode, switch 110 is configured by transmit and switch control 118 to couple bottom antenna 104B to combination TCAS/Mode-S transmitter 116. Combination TCAS/Mode-S transmitter 116 is coupled in the first transmit mode or the second transmit depends upon which of top and bottom antennas 104A and 104B received the stronger radiation signal. Combination TCAS/Mode-S transmitter 116 is coupled to the one of top and bottom antennas 104A and 104B which received the stronger radiation signal. Each of the first and second transmit modes are further configured by switch 110 depending upon the azimuthal direction, or relative bearing, of the strongest received signal, the determination of which is described in detail below. Accordingly, switch 110 is configured to relay a generated interrogation signal to a predetermined one of the multiple directionally transmitting antenna elements of top antenna 104A (in the first transmit mode) or bottom antenna 104B (in the second transmit mode), and a directional transmission, or radiation, pattern is transmitted in the direction of the strongest received signal.

Combined TCAS transponder device 100 preferably includes a display 120 coupled to TCAS receiver 114. Traffic advisories indicating range, range rate, bearing, and when available altitude and altitude rate, are displayed. Traffic advisories without altitude are provided for non-altitude reporting, transponder equipped aircraft. The traffic advisories displayed to the pilot/operator preferably describe the relative positions of proximate aircraft that are, or may become, collision threats. The display of traffic advisories alerts the flight crew to the presence of threat and potential threat aircraft and generally improve the crew's ability to respond to subsequent resolution advisories. Traffic advisories may also improve the crew's ability to visually acquire the traffic. Display 120 is generally similar to prior art display 42 shown in FIG. 3 and functions similarly to provide similar information. Combined TCAS transponder device 100 also includes a control panel 122 coupled to TCAS receiver 114. Control panel 122 is similar to prior art control panel 40 shown in FIG. 4 and functions similarly to input similar information and instructions.

Switch 110 and transmit and switch control 118 also provide coordination between the TCAS/Mode-S transmitter 116 and each of Mode-S transponder receiver 112 and TCAS receiver 114 to prevent transmissions which could interfere with the system's independent functions or cause equipment damage. Switch 110 functions as an isolator between functions, while a control signal from transmit and switch control 118 configures switch 110.

Figure 9:
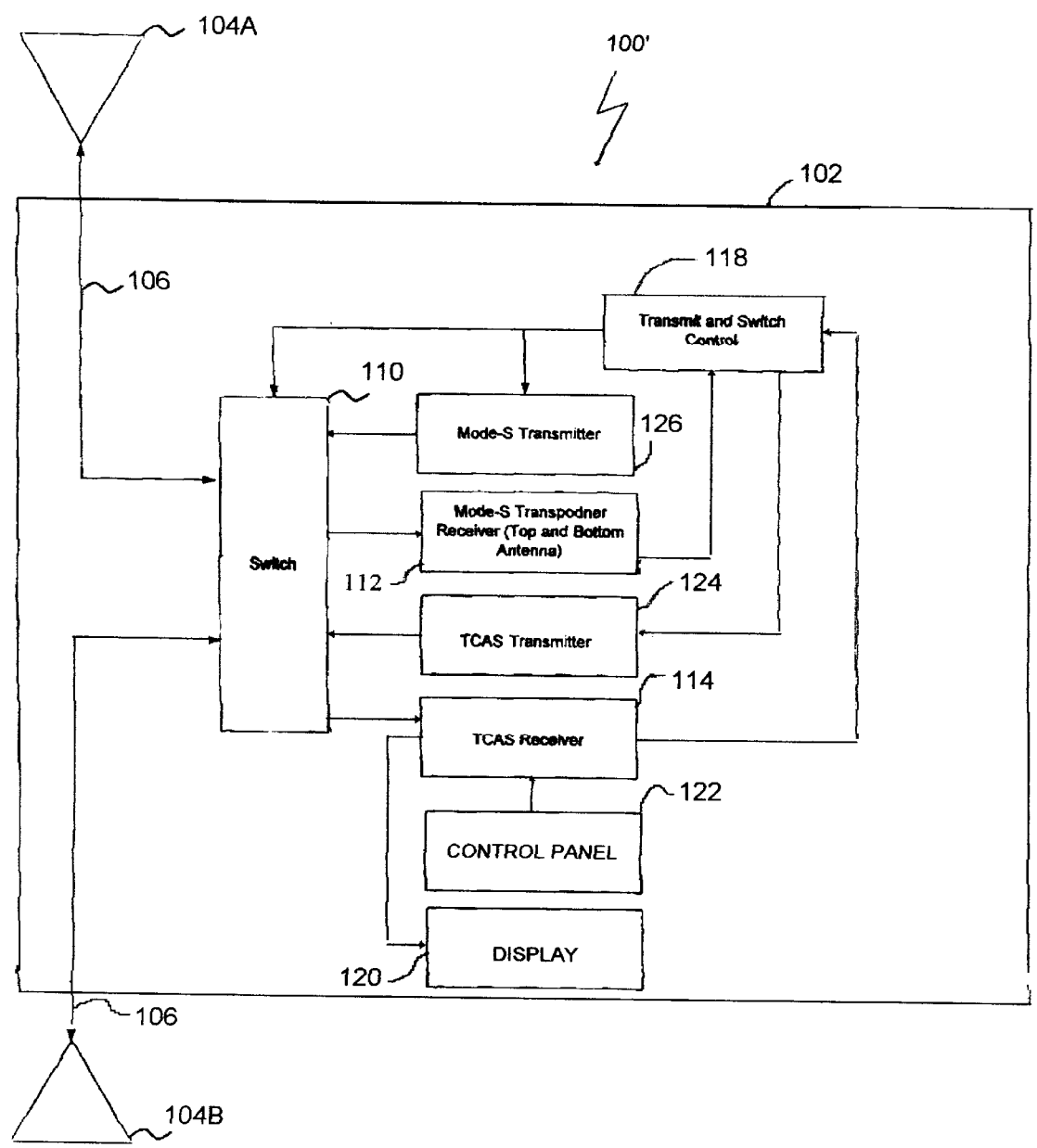
FIG. 9 illustrates an alternative detailed block diagram of the combined airborne Air Traffic Control Radar Beacon System/Mode-Select (ATCRBS/Mode-S) surveillance system and Traffic Alert and Collision Avoidance (TCAS) collision avoidance system device of the present invention shown in FIG. 7.

FIG. 9 illustrates one alternative configuration of the present invention, including the same functions and configuration as the above described configuration, like numbering indicating like functions. Accordingly, combined TCAS transponder device 100' includes independent TCAS transmitter 124 and independent ATCRBS/Mode-S transmitter 126, each of which are well known in the art. Each of independent TCAS transmitter 124 and independent ATCRBS/Mode-S transmitter 126 are independently coupled to switch 110 for driving one or both of common antennas 104A and 104B to transmit a signal. Transmit and switch control circuit 118 is coupled to each of independent TCAS transmitter 124 and independent ATCRBS/Mode-S transmitter 126 individually. Accordingly, transmit and switch control circuit 118 drives TCAS transmitter 124 to generate an interrogation signal while configuring switch 110 to relay the interrogation signal to a predetermined one of top antenna 104A and bottom antenna 104B for transmission. Similarly, transmit and switch control circuit 118 drives independent ATCRBS/Mode-S transmitter 126 to generate a reply signal in response to a received interrogation signal while configuring switch 110 to relay the reply signal to a predetermined one of top antenna 104A and bottom antenna 104B for transmission. Thus, in a first TCAS transmitter mode, independent TCAS transmitter 124 is coupled by switch 110 to one of top and bottom antennas 104A and 104B and in a second TCAS transmitter mode, independent TCAS transmitter 124 is coupled by switch 110 to the other one of top and bottom antennas 104A and 104B. Similarly, in a first ATCRBS/Mode-S transmitter mode, independent ATCRBS/Mode-S transmitter 126 is coupled by switch 110 to one of top and bottom antennas 104A and 104B and in a second ATCRBS/Mode-S transmitter mode, independent ATCRBS/Mode-S transmitter 126 is coupled by switch 110 to the other one of top and bottom antennas 104A and 104B. Transmit and switch control function 118 includes conventional circuitry for separating a TCAS transmission from a ATCRBS/Mode-S transmission. In other words, transmit and switch control function 118 ensures that simultaneous TCAS and ATCRBS/Mode-S transmissions do not interfere with one another or damage the equipment.

Common Directional Antenna

The ATCRBS/Mode-S transponder and the air traffic alert and collision avoidance system functions of combined TCAS transponder device 100 and 100' share common antennas 104A and 104B. As discussed above, common antennas 104 are directional antennas which can be driven to transmit omnidirectional signals. Each of common antennas 104 are capable of receiving and transmitting 1030 MHz interrogation signals and receiving and transmitting 1090 MHz reply signals. Such antennas are known in the art and are described at least in U.S. Pat. No. 5,191,349, Apparatus And Method For An Amplitude Monopulse Directional Antenna, issued Mar. 2, 1993, the entire disclosure of which is incorporated herein by reference. Common antennas 104 are multi-element directional antennas capable of determining the azimuthal direction from which radiation is being transmitted by the relative induced signal amplitudes at each of the antenna elements. Common antennas 104 are suitable both for an ATCRBS/Mode-S transponder system and for air traffic alert and collision avoidance system inter-aircraft communications. In preferred embodiments, common antennas 104 provide a minimum profile to reduce drag, are relatively simple to manufacture, and are relatively impervious to environmental hazards while precise positional relationships between the components are maintained.

Figure 10:
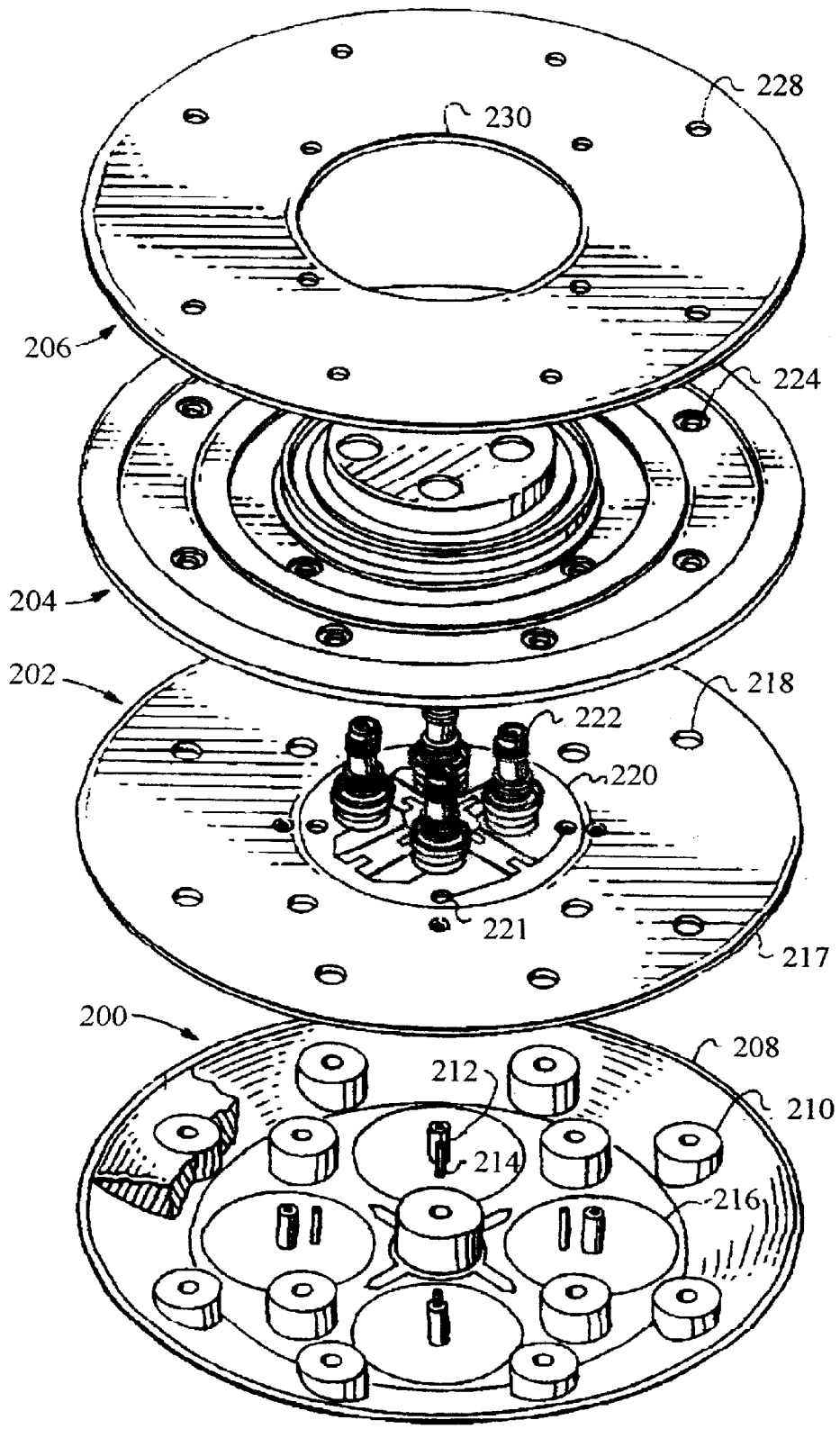
FIG. 10 illustrates an exploded view of one embodiment of the directional antenna capable of simultaneously receiving and monitoring both ground based Air Traffic Control Radar Beacon System/Mode-Select (ATCRBS/Mode-S) surveillance system and airborne Traffic Alert and Collision Avoidance (TCAS) collision avoidance system interrogation signals and capable of transmitting such interrogation signals and of transmitting reply signals in response to such interrogation signals.

FIG. 10 illustrates just one possible embodiment of directional antenna 104. Any of several commercially available directional antennas are suitable in practicing the present invention. For example, one preferred embodiment of the present invention incorporated the aforementioned Allied-Signal antenna part number ANT 81 A. The following description of a direction antenna as taught in above incorporated U.S. Pat. No. 5,191,349 is provided for illustrative purposes only and is not intended to limit the scope of the present invention in any way. FIG. 10 illustrates an exploded view of directional antenna 104, including a radome assembly 200, a ground plate assembly 202, a base plate 204, and adapter plate 206. A radome 208 is manufactured of a polyethersufone resin having various structures formed on an interior surface, including fastening posts 210, internally threaded grounded portions 212 of the monopole antenna elements, and free portions 214 of the monopole antenna elements. Fastening posts 210 are provided with surfaces, recessed relative to the exterior of radome 208, for engaging fasteners which pass through apertures in fastening posts 210 to couple either to adapter plate 206 or host aircraft 1, shown in FIG. 1. Monopole antenna portions 212 and 214 are coated with copper directly on the surfaces thereof. Capacitors 216 are formed directly on the interior surface of radome 208. Upon assembly, copper coated antenna portions 212 and 214 contact capacitors 216 to form folded monopole antenna elements. Structural decoupling elements, for example, copper coated fastening posts 210, between the folded monopole antenna elements decouple the individual antenna elements.

Ground plate 204 includes a conducting plate 217 provided with passages 218 for fasteners coupling antenna 104 to adapter plate 206 or to host aircraft 1. A beam forming circuit is formed on circuit assembly 220, which is described in detail below and in above incorporated U.S. Pat. No. 5,191,349. Circuit assembly 220 includes passages 221 aligned with coordinated passages formed in ground plate 204. Passages 221 provide clearance for free antenna elements 214 to extend therethrough conducting plate 217 and through beam forming circuit card assembly 220. Connectors 222 electrically couple the processing and signal generating apparatus of host aircraft 1 to the beam forming circuit on circuit card assembly 220.

Base plate 204 provides structural support for antenna 104. Base plate 204 includes passages 224 for the fasteners (not shown) coupling antenna 104 either to adapter plate 206 or host aircraft 1. Base plate 204 also includes passages 226 through which pass electrical connectors 222. Electrical connectors 222 couple antenna 104 to combined TCAS transponder 100 mounted on host aircraft 1.

Optional adapter plate 206 adapts antenna 104 to any aircraft surface configuration with formed passages 228 providing multiple securing points. A central passage 230 provide clearance for electrical connectors 222.

FIG. 11 illustrates components of a beam forming network 250 formed on circuit assembly 220. Terminals 252 are each coupled to one of electrical connectors 222. Two power dividing components 254A are positioned on opposite sides of the center of beam forming circuit network 250 and are coupled to two terminals 252. Each of two power dividing components 254A are coupled to another two power dividing components 254B. Each of two power dividing components 254B are coupled through a ¼ wave transformer 256 to one free antenna element portion 214 extending through passage 221. ¼ wave transformer 256 is coupled to antenna elements 214 by a contact (not shown). A conducting strip, described in detail below and in above incorporated U.S. Pat. No. 5,191,349, is positioned between each side of each power dividing component 254 and includes a capacitor 260. Capacitor 260 is essentially a short circuit at operational frequencies and is used for test purposes. Components 262 are each a resistor and a capacitor, coupled in parallel, which are used for test purposes.

FIG. 12 illustrates the operation of power dividing component 254. Power dividing component 254 includes two parallel conducting strips 264 and 266 coupled at their ends by conducting strips 268. Conducting strips 268 include capacitors 260, discussed above. When input power P with 0° phase is applied to one end of one conducting strip 268, the second end of conducting strip 268 provides an output power ½ P with −90° phase relative to input power P. The end of conducting strip 266 proximate the end of conducting strip 264 to which power P was applied provides no power output. The end of conducting strip 266, opposite to the end providing no power output, provides an output power of ½ P with −180° phase relative to the input power. In operation, antenna 104 outputs directional radiation signals 98, shown in FIG. 6 and omnidirectional radiation signals 94 and/or 96, shown in FIGS. 5 and 6, respectively.

In contrast to the method of directional transmission described above and in above incorporated U.S. Pat. No. 5,191,349, the aforementioned AlliedSignal antenna forms a directional beam or transmission pattern 94, as shown in FIG. 5, by delivering power to all four antenna elements and modifying the phase at each element with respect to the phases of each other antenna element. The phase is shifted to combine the signals from all of the antenna elements in one direction and cancel the signals in other directions. Thus, proper phasing of the individual antenna elements enables the AlliedSignal directional antenna to transmit omnidirectional pattern 94, 96, as shown in FIGS. 5 and 6, respectively. Such omnidirectional transmission patterns are useful for transmitting any of the various TCAS and ATCRBS/Mode-S transmissions described herein, including omnidirectional unsolicited Mode-S broadcasts or squitters, replies to ATCRBS/Mode-S interrogation signals, and transmission of ATCRBS/Mode-S interrogation signals.

Figure 13:
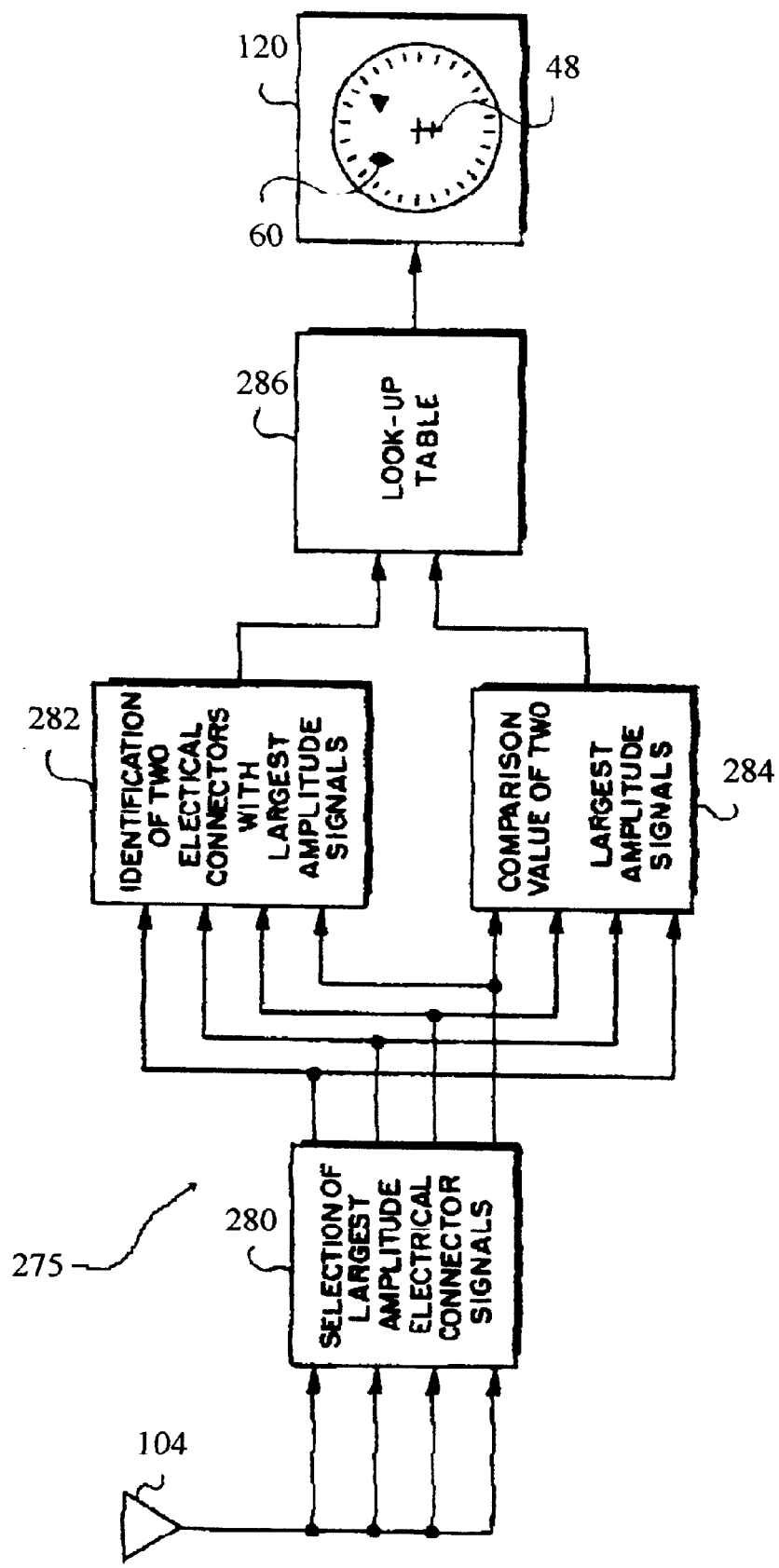
FIG. 13 illustrates the conversion of signals from the directional antenna of FIG. 10 used in the combined TCAS transponder device of the present invention as shown in FIGS. 8 and 9.

FIG. 13 illustrates one possible signal conversion function 275 for converting signals from antenna 104 to display 120 of the combined TCAS transponder device 100 and 100' of the present invention, shown in FIGS. 8 and 9, respectively. In FIG. 13, the signals from antennas 104 are converted to display the direction of the intruder aircraft relative to host aircraft 1, shown in FIG. 1. The directional signals from antennas 104 are compared for selection of the two strongest signals at an amplitude comparitor 280. The two selected strongest signals are applied to identifier 282, wherein the electrical connectors 222, shown in FIG. 10, having the strongest signals are identified. The two selected strongest signals are also applied to a value-of-two comparitor 284, wherein the relative strength of the two selected signals is compared. Signals identifying the two electrical connectors 222 having the strongest signals as identified by identifier 282 and the value of the comparison of the two strongest signals as provided by value-of-two comparitor 284 are applied to look-up table 286. Look-up table 286 provides to display 120 a bearing or direction relative to host aircraft 1, whereby the information is displayed as described above. The signals from electrical connectors are converted to digital signals by conventional methods commonly known to those of ordinary skill in the relevant art and are processed by combined TCAS transponder device 100 to determine threat potential and evasive action as well as to determine the appropriate direction in which to transmit a reply signal to a received interrogation signal and the appropriate direction in which to transmit an interrogation signal to a detected target aircraft.

Another method for determining the angle of arrival data, which provides the relative direction to the incoming or received signal, uses a method based on signal phase, commonly known as phase interferometry. For example, if the present invention is practiced using the aforementioned AlliedSignal antenna, angle of arrival data is determined using phase interferometry. Direction finding using a phase interferometer is described generally in U.S. Pat. No. 4,638,320, Direction Finding Interferometer, issued Jan. 20, 1987, the entire disclosure of which is incorporated herein by reference. Briefly, phase interferometry is practiced using multiple, preferably four, antenna elements positioned on two orthogonal axes at points equidistant from the intersection of the axes. The incoming transmission wave impinges upon each of the four antenna elements at different instances in time. Thus, the signal as detected by each antenna element is at a different location or phase. Phase comparisons are made between the incoming signal wave as detected by the individual antenna elements to determine the angle of incidence or angle of arrival data.

Preferably, the circuitry implementing signal conversion function 275 is contained in transmit and switch control function 118, described above and shown in FIGS. 8 and 9. Alternatively, the circuitry implementing signal conversion function 275 is contained in each of dual Mode-S transponder signal receiver 112 and TCAS receiver 114. Both dual Mode-S transponder signal receiver 112 and TCAS receiver 114 are coupled to send an appropriate control signal to transmit and switch control function 118 to configure switch 110 to transmit a directional interrogation and/or reply signal via one of top and bottom antennas 104A and 104B.

Furthermore, although disclosed in combination with combined TCAS transponder system 100, directional antennas 104 are used in combination with stand-alone Air Traffic Control Radar Beacon System/Mode Select (ATCRBS/Mode-S) to form a low-cost and reduced power system, wherein the power generate is only sufficient to transmit a directional 1090 MHz transponder reply signal using a single antenna 104. The generated transponder reply signal is coupled to one of top and bottom antennas 104A and 104B such that the signal is transmitted in the direction of the strongest received interrogation signal. Optionally, if the tracking information determined by TCAS receiver 114 indicates that the interrogating aircraft has moved relative to host aircraft 1 sufficiently that a more effective reply signal is possible by transmission through a different one of the antenna elements, then transmit and switch control function 118 sends a control signal to switch 110 to transmit using that different one of the antenna elements, as appropriate.

Those of ordinary skill in the relevant art recognize that the present invention is not limited to the combined TCAS transponder device described above and shown in the FIGURES. Although the foregoing invention has been described in detail for purposes of clarity, it will be obvious to those of ordinary skill in the relevant art that certain modifications may be practiced within the scope of the appended claims. For example, combined TCAS transponder device is alternatively modified to work with a display 120 and or/control panel 122 different from those shown in the prior art. Display 120 alternatively provides more or less or different textual messaging, provides different altitude rate-of-change reporting, provides display brightness and/or contrast control, or provides one or more other unspecified distinctive display features. Control panel 122 alternatively provides variable displayed range limits, i.e. zoom in/out control, provides multiple transponder failure indicators reporting both primary transponder 12A and secondary transponder 12B, provides different nature, function and/or location for one or more control switches, or provides one or more other unspecified distinctive control features.

While the preferred embodiment of the invention has been illustrated and described, it will be appreciated that various changes can be made therein without departing from the spirit and scope of the invention.

The embodiments of the invention in which an exclusive property of privilege is claimed are defined as follows:

1. A method for transmitting directional Air Traffic Control Radar Beacon System and Mode Select signals, the method comprising the steps of:
    using a first and a second directional antennas to independently acquire an interrogation signal at each of said first and second directional antennas;
    determining a directional source of said interrogation signal;
    configuring a switch to couple a transponder transmitter to one of said first and second directional antennas for transmitting a directional radiation pattern toward said determined directional source of said interrogation signal; and
    transmitting said directional radiation pattern.

2. The method recited in claim 1, wherein said interrogation signal comprises an Air Traffic Control Radar Beacon System/Mode Select format interrogation signal.

3. The method recited in claim 2, wherein said directional radiation pattern comprises a Mode Select waveform.

4. The method recited in claim 3, wherein said directional radiation pattern further comprises a Mode-A identification signal and a Mode-C altitude signal.

5. The method recited in claim 4, wherein said step of using first and second directional antennas to independently acquire an interrogation signal further comprises alternately configuring said switch to acquire said interrogation signal on said first and second directional antennas.

6. The method recited in claim 5, wherein said step of determining a directional source of said interrogation signal is determined using phase interferometry.

7. The method recited in claim 5, wherein:
    said first and second directional antennas each comprise a plurality of directional antenna elements; and
    said step of determining a directional source of said interrogation signal further comprises determining the relative strength of said interrogation signal acquired by ones of said directional antenna elements.

8. The method recited in claim 7, wherein said step of determining the relative strength of said interrogation signal acquired by ones of said directional antenna elements further comprises determining the relative induced signal amplitudes at each of said directional antenna elements.

9. The method recited in claim 5, further comprising a step of receiving said interrogation signal into a Mode Select transponder receiver coupled to said switch.

10. The method recited in claim 9, wherein said Mode Select waveform further comprises a unique address code.

11. A method for acquiring Air Traffic Control Radar Beacon System format signals and transmitting directional reply signals in response, the method comprising the steps of:
    using a first and second directional antennas to independently acquire an Air Traffic Control Radar Beacon System format interrogation signal at each of first and second directional antennas;
    alternately configuring a switch in a first receive mode coupling said first directional antenna to a transponder receiver and in a second receive mode coupling said second antenna to said transponder receiver;
    receiving said interrogation signal using said transponder receiver;
    determining a vertical directional source of said received interrogation signal;
    determining an azimuthal directional source of said received interrogation signal;
    generating an Air Traffic Control Radar Beacon System format reply signal;
    configuring said switch to transmit said reply signal in a directional radiation pattern toward said determined vertical and said determined azimuthal directional source of said received interrogation signal; and
    transmitting said directional radiation pattern toward said determined vertical and said determined azimuthal directional source of said received interrogation signal.

12. The method recited in claim 11, wherein said step of determining a vertical directional source of said received interrogation signal, further comprises comparing the relative signal strength of an acquired interrogation signal at said first directional antenna and at said second directional antenna.

13. The method recited in claim 12, wherein:
said directional antennas comprise a plurality of directional antenna elements; and
said step of determining an azimuthal directional source of said received interrogation signal further comprises comparing the relative strength of said acquired interrogation signal at different ones of said directional antenna elements.

14. The method recited in claim 12, wherein said step of determining an azimuthal directional source of said received interrogation signal further comprises comparing the phase of said acquired interrogation signal at different ones of said antenna elements using phase interferometry.

15. The method recited in claim 11, wherein said step of generating an Air Traffic Control Radar Beacon System format reply signal further comprises generating a Mode Select waveform.

16. The method recited in claim 15, wherein:
said step of generating an Air Traffic Control Radar Beacon System format reply signal further comprises generating a control signal; and
said step of configuring a switch further comprises configuring said switch in response to said control signal.

17. The method recited in claim 16, wherein said step of generating an Air Traffic Control Radar Beacon System format reply signal further comprises generating a Mode-A identification signal and a Mode-C altitude signal.

18. The method recited in claim 17, wherein:
said Air Traffic Control Radar Beacon System format interrogation signal is a coded 1030 MHz microwave interrogation signal; and
said Air Traffic Control Radar Beacon System format reply signal is a 1090 MHz microwave reply signal.

19. An airborne directional transponder device for detecting and responding to Air Traffic Control Radar Beacon System format interrogation signals using a pair of directional antennas, the device comprising:
first and second directional antennas;
a switch coupled to of each said first and second antenna;
a transponder receiver coupled to said switch for receiving and decoding an interrogation signal, said receiver including a circuit for determining a relative directional source of a received and decoded interrogation signal;
a transmitter coupled to said switch for transmitting a signal in response to said received and decoded interrogation signal; and
a transmit and switch control circuit coupled to said switch for coupling said switch to a predetermined one of said first and second directional antennas for transmitting said response signal toward said relative directional source of said received and decoded interrogation signal.

20. The directional transponder device recited in claim 19, wherein said interrogation signal is an Air Traffic Control Radar Beacon System format interrogation signal.

21. The directional transponder device recited in claim 20, wherein said circuit for determining a relative directional source of a received and decoded interrogation signal further comprises a circuit for determining the relative signal strength of said interrogation signal acquired at each of said first and second antennas.

22. The directional transponder device recited in claim 21, wherein:
each of said first and second directional antennas further comprises a plurality of antenna elements; and
said circuit for determining a relative directional source of a received and decoded interrogation signal further comprises a circuit for determining the relative signal strength of said interrogation signal acquired at each of said plurality of antenna elements.

23. The directional transponder device recited in claim 21, wherein:
each of said first and second directional antennas further comprises a plurality of antenna elements; and
said circuit for determining the relative signal strength of said received and decoded interrogation signal further comprises a circuit for comparing the relative phase of said interrogation signal at different ones of said antenna elements using phase interferometry.

24. The directional transponder device recited in claim 20, wherein said first and second directional antennas are spaced apart from one anther.

25. The directional transponder device recited in claim 24, wherein said first and second directional antennas are located on opposing surfaces of a host aircraft.

26. An directional transponder device for monitoring, detecting and responding to Air Traffic Control Radar Beacon System format interrogation signals using a pair of directional antennas, each antenna having a plurality of antenna elements, the device comprising:
first and second directional antennas mounted on opposing surfaces of an aircraft;
a switch coupled to each of said antenna elements of each said first and second antenna;
a transponder receiver coupled to said switch for monitoring, receiving and decoding an Air Traffic Control Radar Beacon System format interrogation signal, said receiver including a circuit for determining a relative vertical directional source and a relative azimuthal directional source of a received Air Traffic Control Radar Beacon System format interrogation signal;
a transponder transmitter coupled to said switch for transmitting an Air Traffic Control Radar Beacon System format reply signal in response to said received and decoded Air Traffic Control Radar Beacon System format interrogation signal; and
a transmit and switch control circuit responsive to a signal generated by said transponder transmitter, said transmit and switch control circuit coupled to said switch for coupling said switch to a predetermined one of said antenna elements of a predetermined one of said first and second directional antennas for transmitting said reply signal toward said relative vertical and azimuthal directional source of said received and decoded Air Traffic Control Radar Beacon System format interrogation signal.

27. The directional transponder device recited in claim 26, wherein said circuit for determining a relative vertical directional source of said interrogation signal further comprises a circuit for determining relative signal strength of said received interrogation signal acquired at each of said first and second antennas.

28. The directional transponder device recited in claim 27, wherein:

each said directional antenna further comprises a plurality of antenna elements having different but overlapping directional reception and transmission patterns; and said circuit for determining a relative azimuthal directional source of a received interrogation signal further comprises a circuit for determining the relative signal strength of said received interrogation signal acquired at each of said plurality of antenna elements.

29. The directional transponder device recited in claim 28, wherein said circuit for determining the relative signal strength of said received interrogation signal acquired at each of said plurality of antenna elements further comprises a circuit for determining the relative induced signal amplitudes at each of said individually addressable directional antenna elements.

30. The directional transponder device recited in claim 29, wherein said switch is coupled to said antenna element determined to have the largest said induced signal amplitude relative to each other of said antenna elements for transmitting said reply signal toward said relative vertical and azimuthal directional source of said received Air Traffic Control Radar Beacon System format interrogation signal.

31. The directional transponder device recited in claim 27, wherein:

each said directional antenna further comprises a plurality of antenna elements; and said circuit for determining a relative azimuthal directional source of a received interrogation signal further comprises a circuit for determining the relative phase of said received interrogation signal acquired at each of said plurality of antenna elements using phase interferometry.

* * * * *